July 11, 1933.   S. BRAND   1,917,355
CASH REGISTER
Filed June 10, 1927   19 Sheets-Sheet 1

Inventor
Samuel Brand
By
His Attorneys

July 11, 1933.                S. BRAND                 1,917,355
                            CASH REGISTER
                         Filed June 10, 1927      19 Sheets-Sheet 2

Inventor
Samuel Brand
By Earl Beust
Henry E. Stauffer
His Attorneys

July 11, 1933.  S. BRAND  1,917,355
CASH REGISTER
Filed June 10, 1927   19 Sheets-Sheet 3

Inventor
Samuel Brand
By
His Attorneys

July 11, 1933.                S. BRAND                1,917,355
                            CASH REGISTER
                         Filed June 10, 1927          19 Sheets-Sheet 4
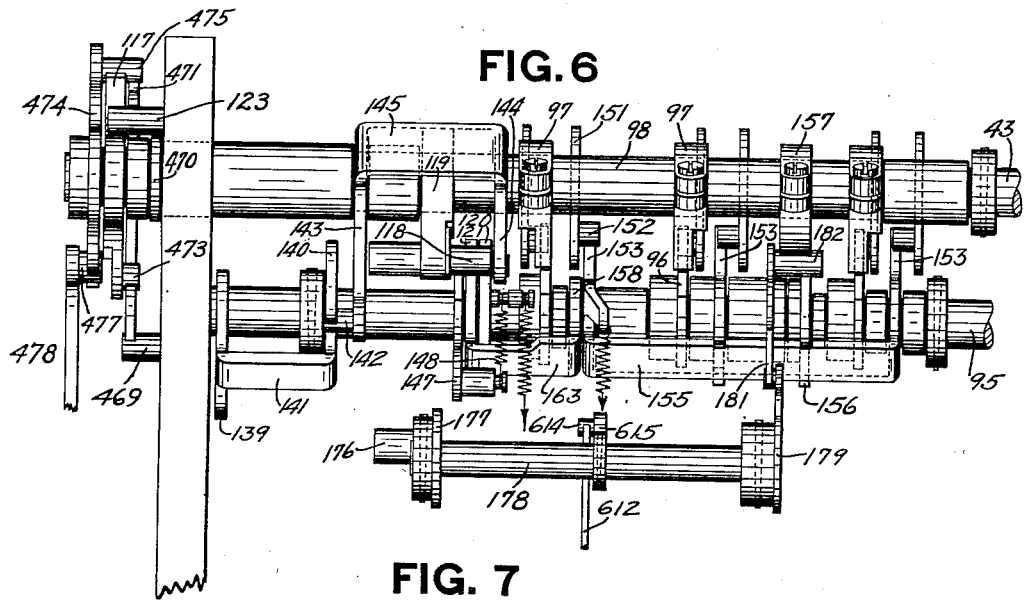
FIG. 6
FIG. 7
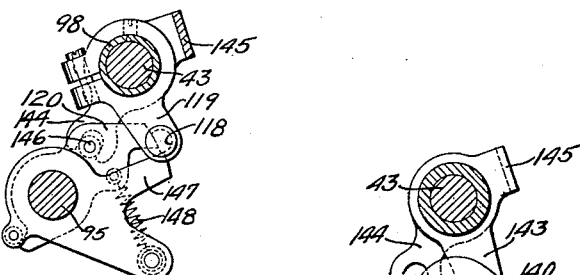
FIG. 8
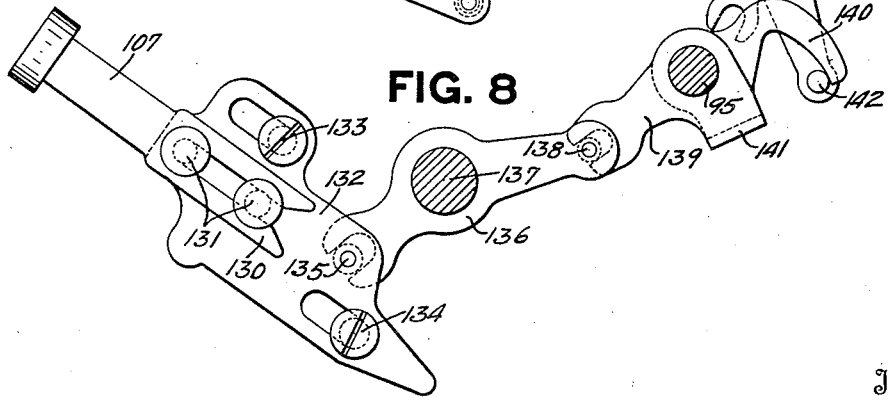
Inventor
Samuel Brand
By Earl Beust
Henry C. Stauffer
His Attorneys July 11, 1933.   S. BRAND   1,917,355
CASH REGISTER
Filed June 10, 1927   19 Sheets-Sheet 6
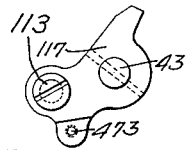
FIG. 11A
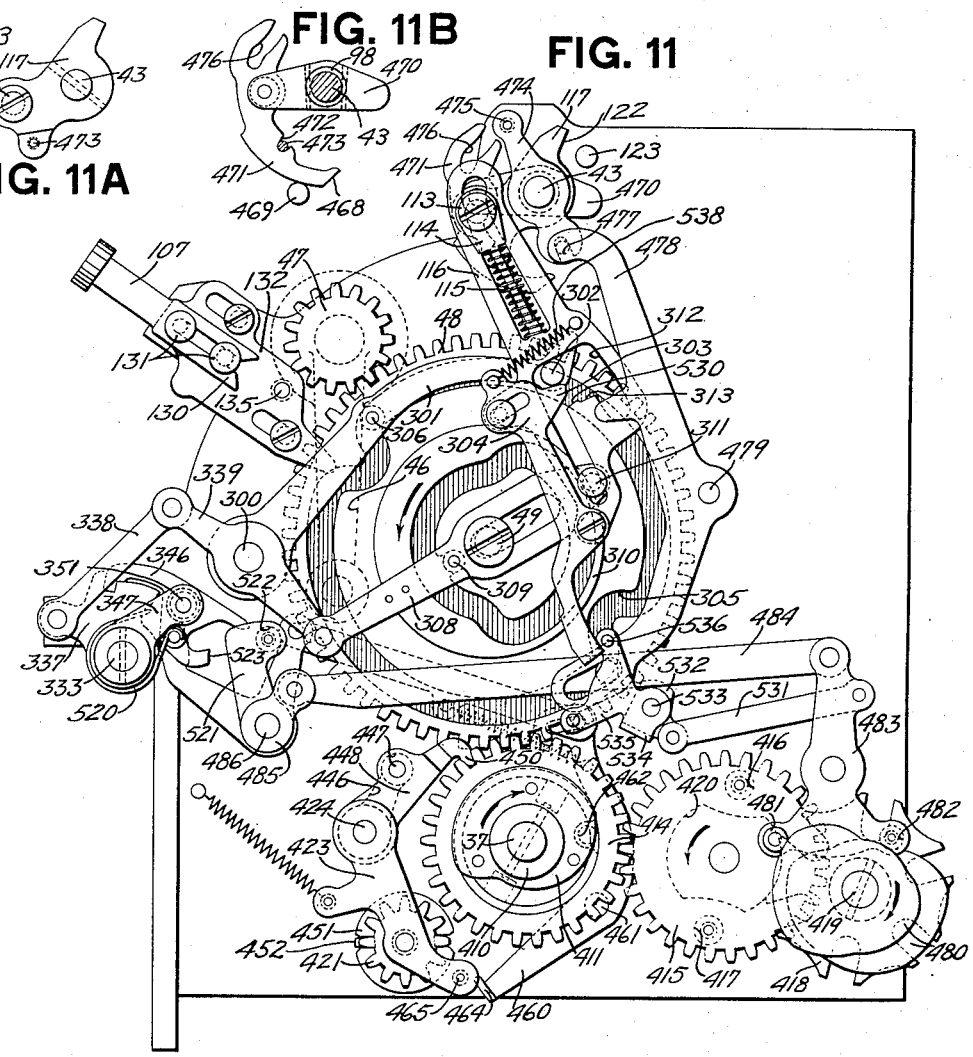
FIG. 11B   FIG. 11
FIG. 12
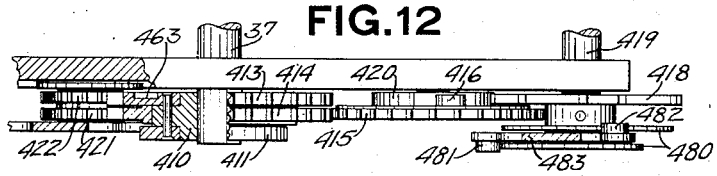
Inventor
Samuel Brand
By Carl Beust
Henry E. Stauffer
His Attorneys July 11, 1933.  S. BRAND  1,917,355
CASH REGISTER
Filed June 10, 1927   19 Sheets-Sheet 7

Inventor
Samuel Brand
By
His Attorneys

July 11, 1933.  S. BRAND  1,917,355
CASH REGISTER
Filed June 10, 1927   19 Sheets-Sheet 8
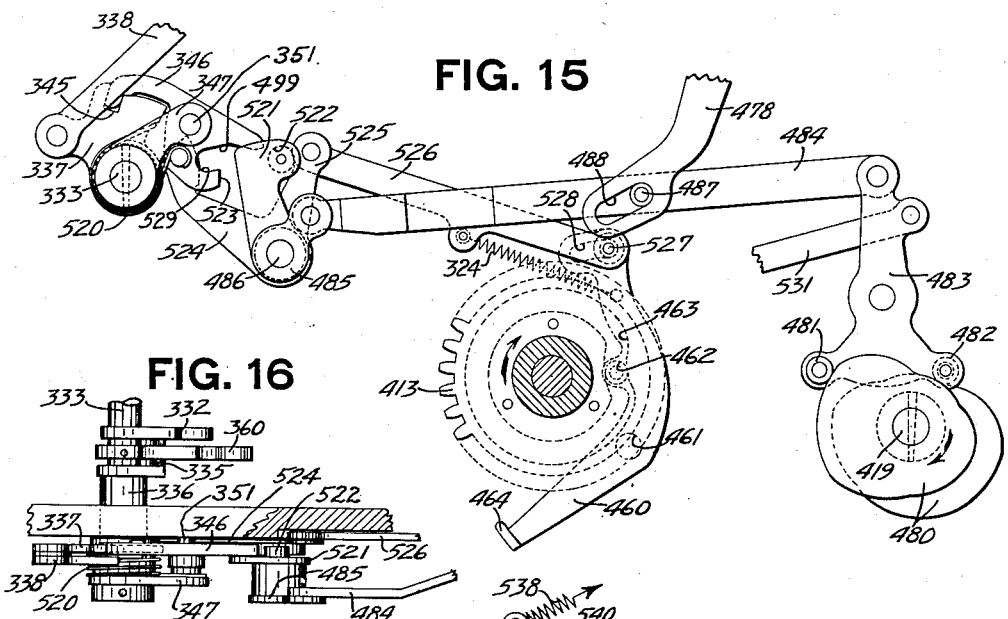
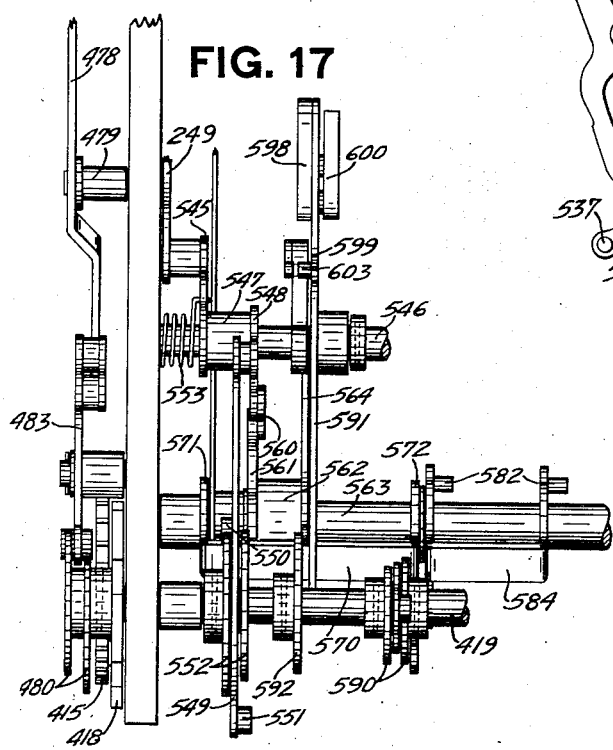
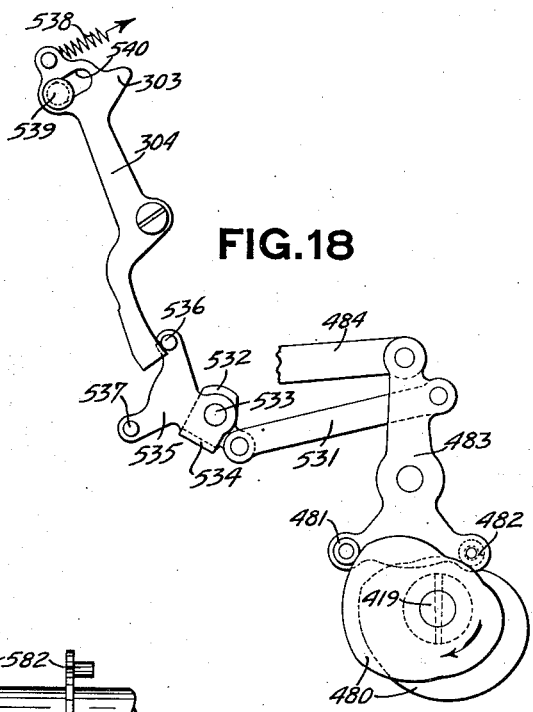
Inventor
Samuel Brand
By
His Attorneys Inventor
Samuel Brand
By Carl Bens
Henry Stauffer
His Attorneys July 11, 1933.  S. BRAND  1,917,355
CASH REGISTER
Filed June 10, 1927   19 Sheets-Sheet 10

Inventor
Samuel Brand
By Carl Beust
Henry C. Stauffer
His Attorneys

July 11, 1933.    S. BRAND    1,917,355
CASH REGISTER
Filed June 10, 1927    19 Sheets-Sheet 12

Inventor
Samuel Brand
By Pearl Beust
Henry E. Stauffer
His Attorneys

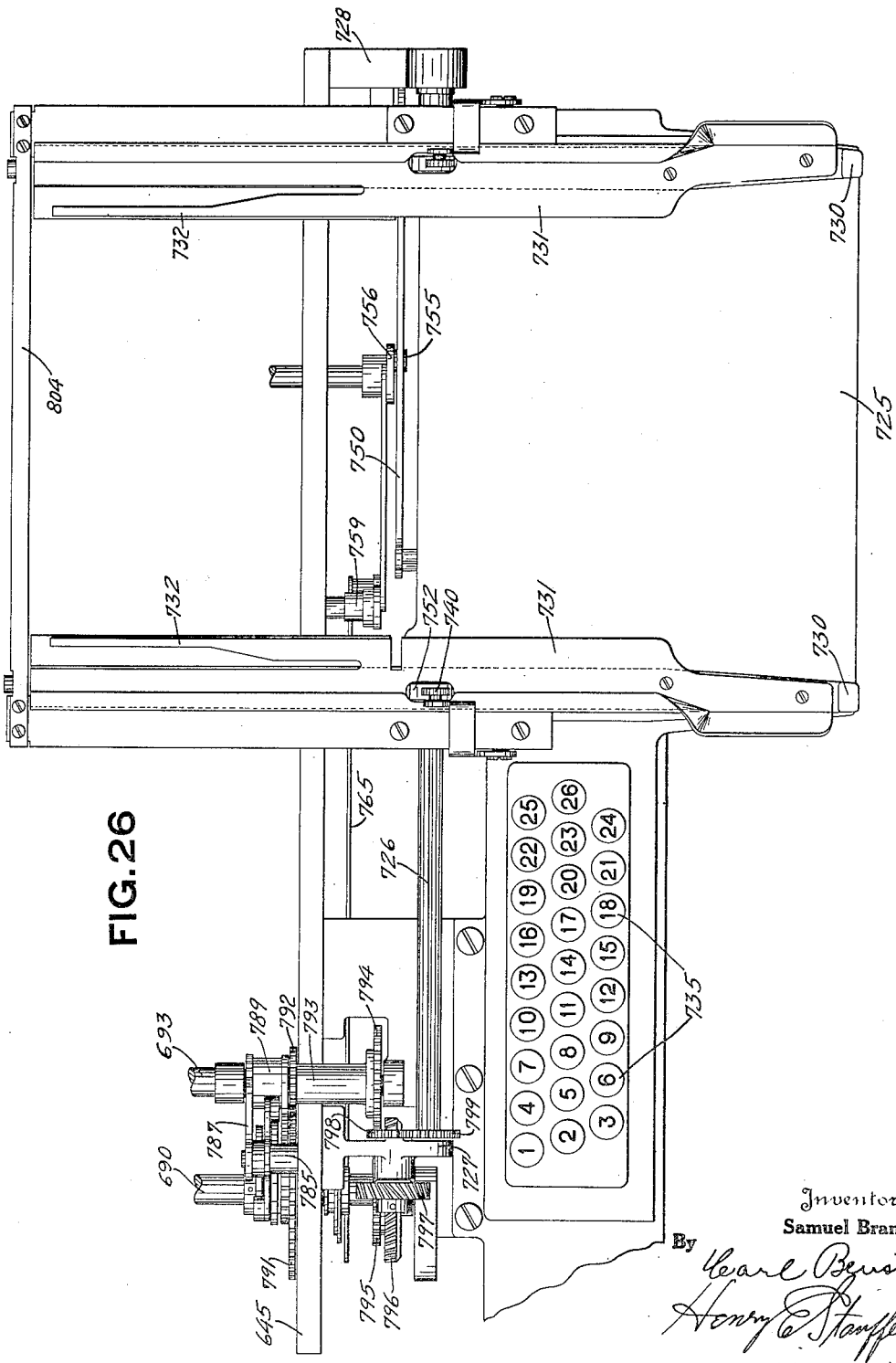

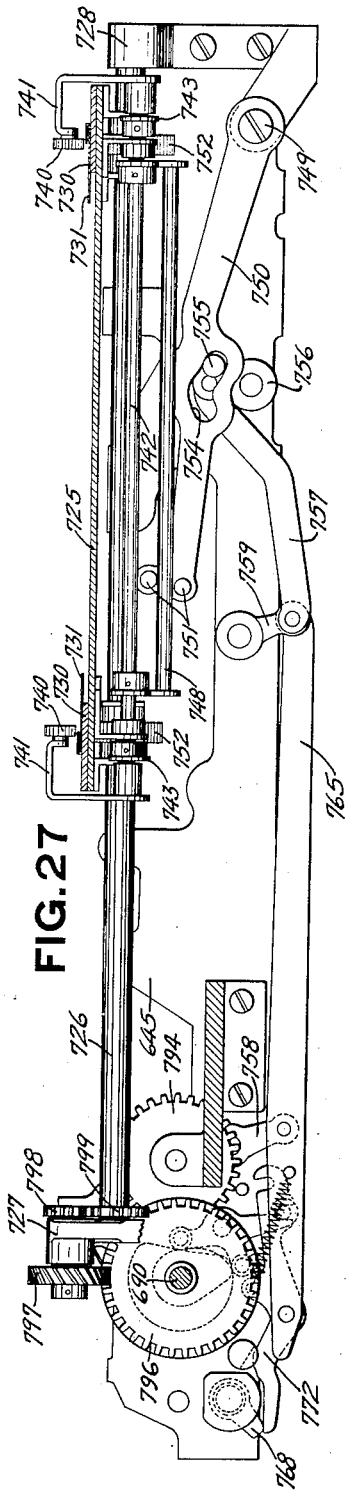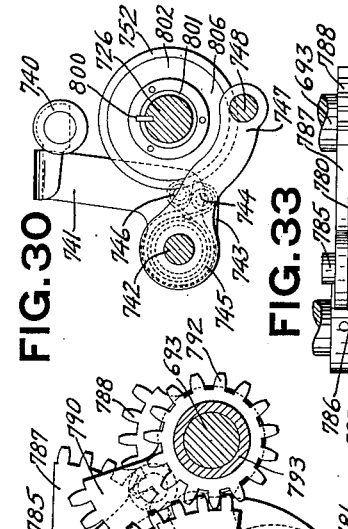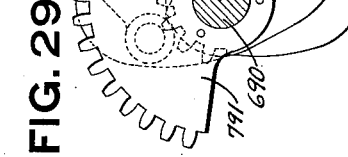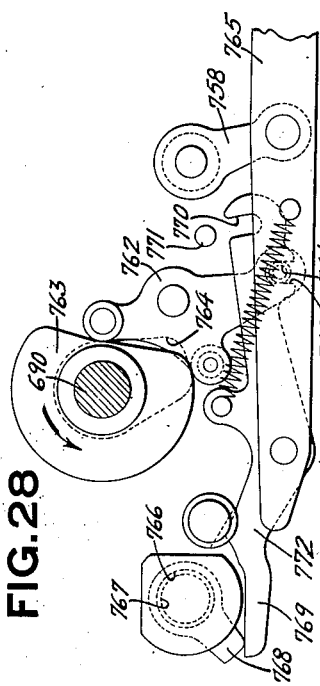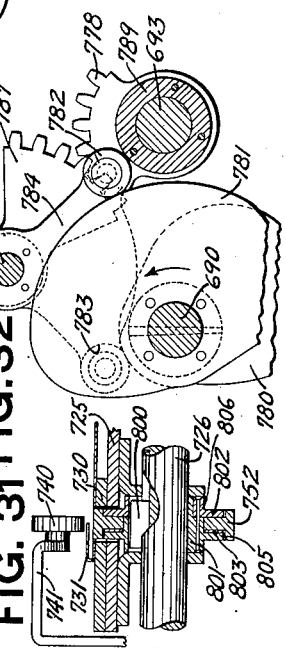

July 11, 1933. S. BRAND 1,917,355

CASH REGISTER

Filed June 10, 1927 19 Sheets-Sheet 15

Inventor
Samuel Brand
By
His Attorneys

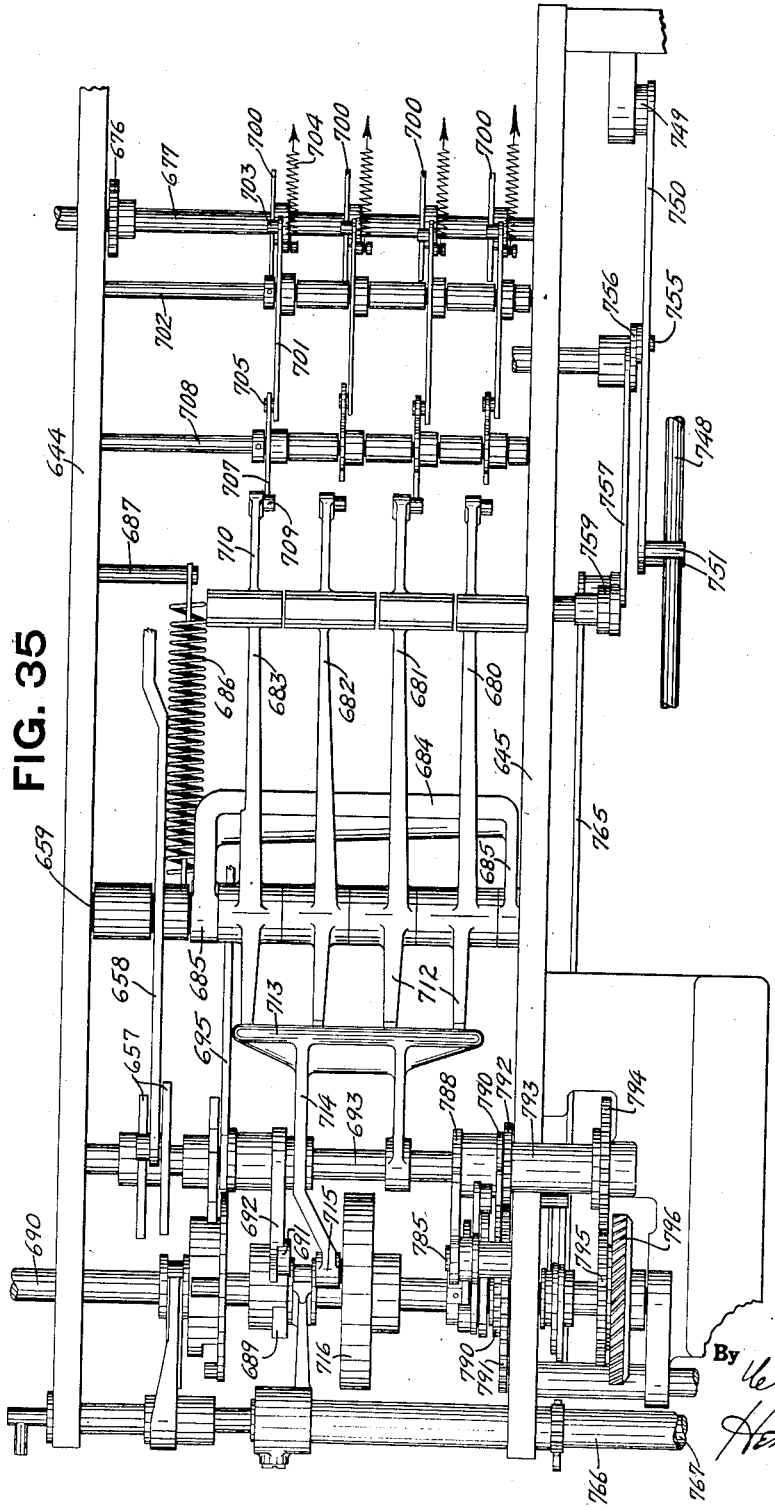
July 11, 1933.  S. BRAND  1,917,355
CASH REGISTER
Filed June 10, 1927  19 Sheets-Sheet 16
Inventor
Samuel Brand
His Attorneys July 11, 1933.   S. BRAND   1,917,355
CASH REGISTER
Filed June 10, 1927   19 Sheets-Sheet 17

FIG. 37

JOHN DOE
WHOLESALE GROCERIES
ACCOUNT NUMBER 18762

NAME Mr. John Smith
ADDRESS 000 Blank St.

| Description | Line No | Date | Debit | Credit | Balance |
|---|---|---|---|---|---|
| Balance Carried forward | 1 | 1--7-25 | | | ··1,256.37 |
| Paid on Account | 2 | 1--7-25 | | ··200.00 | ··1,056.37 |
| 3 Cases Soap | 3 | 1--8-25 | ···18.00 | | |
| 2 bbl Apples | 4 | 1--8-25 | ····9.60 | | |
| 12 bbl flour | 5 | 1--8-25 | ···37.24 | | |
| 200 lbs Coffee & 200 lbs Spices | 6 | 1--8-25 | ··352.80 | | ··1,474.01 |
| 100 Cartons Cereal Returned | 7 | 1-16-25 | | ··330.00 | ··1,144.01 |
| 500 lbs dried beans | 8 | 1-18-25 | ···40.00 | | ··1,184.01 |
| Paid on Account | 9 | 1-18-25 | | ·1,000.00 | ··· 184.01 |
| Breakfast food returned | 10 | 1-18-25 | | ··200.00 | 999,984.01 |
| Over Draft | 11 | 1-18-25 | | ····0.01 | ····15.99 |
| 70 lbs Creamery Butter | 12 | 1-18-25 | ···28.00 | | ····12.00 |
| Over Draft | 13 | 1-20-25 | ····0.01 | | ····12.01 |
| 300 lbs Wrapping paper | 14 | 1-20-25 | ···27.60 | | ····39.61 |
| | 15 | | | | |
| | 16 | | | | |
| | 17 | | | | |

FIG. 38

12 bbl Flour
1--8-25 ···37.24                              CD
200 lbs Coffee & 200 lbs Spices
1--8-25 ··352.80        ··1,474.01 CS
The Roe Market
1--8-25                 ···476.00      OB
Paid on Account
1--8-25        ···500.00  999,976.00 PD 1--8-25                 999,976.00     OB
Over Draft
1--8-25         ·····0.01 ····24.00    OD
The William Brown Grocery
1--8-25                 ··2,375.75     OB
200 lbs Cheese
1--8-25 ···64.00        ··2,439.75 CD
The Green Grocery
1--8-25                 ··1,050.30     OB
350 lbs Butter Returned
1--8-25        ···154.00                CR Inventor
Samuel Brand
By Carl Berst
Henry E. Stauffer
His Attorneys July 11, 1933.  S. BRAND  1,917,355
CASH REGISTER
Filed June 10, 1927    19 Sheets-Sheet 18

Inventor
Samuel Brand
By
His Attorneys

July 11, 1933.  S. BRAND  1,917,355
CASH REGISTER
Filed June 10, 1927   19 Sheets-Sheet 19

Inventor
Samuel Brand
By
His Attorneys

Patented July 11, 1933

1,917,355

UNITED STATES PATENT OFFICE

SAMUEL BRAND, OF DAYTON, OHIO, ASSIGNOR TO THE NATIONAL CASH REGISTER COMPANY, OF DAYTON, OHIO, A CORPORATION OF MARYLAND

CASH REGISTER

Application filed June 10, 1927. Serial No. 197,941.

This invention relates to cash registers and the like, and has more particular relation to the type of machines shown and described in Letters Patent of the United States, No. 1,230,864, issued to W. A. Chryst, on June 26, 1917, and No. 1,242,170 and No. 1,394,256, issued to F. L. Fuller, on October 9, 1917, and October 18, 1921, respectively, No. 1,619,796 and No. 1,761,542, issued to B. M. Shipley, on March 1, 1927, and June 3, 1930, respectively.

One object of this invention is to provide a machine adapted to enter the amount of an item on a totalizer, print such amount, and then clear the totalizer and print the amount that stood on the totalizer, in a continuous operation, and without any further manipulation of the controlling mechanism.

Another object is to provide means for automatically changing the timing of the totalizer engaging mechanism, as is necessary in clearing operations, instead of doing it by hand.

Another object is to provide means operative during an automatic resetting operation, for releasing the amount keys at the end of the adding operations, and maintaining the control keys in their depressed position until the end of the resetting operation.

A further opject is to disconnect the release shaft from its restoring mechanism during the adding cycle of a three-cycle operation, and to reengage said members near the end of the resetting operation.

Another object is to provide a novel means to control the differential mechanism of a machine adapted to make plural-cycle operations, whereby said differential is adjusted differentially during one cycle and constantly during other cycles.

Another object is to so construct the printing mechanism that two superimposed cards will be printed upon, together with means for automatically removing and replacing the upper card so that impressions may be made on the cards in adding and total taking operations whether performed as separate operations or as one continuous operation.

With these and incidental objects in view, the invention includes certain novel features of construction and combinations of parts, the essential elements of which are set forth in appended claims, and a preferred form or embodiment of which is hereinafter described with reference to the drawings which accompany and form part of this specification.

Of said drawings:

Fig. 6 is a detail rear elevation of the release and interlocking mechanisms.

Fig. 7 is a detail side view of a portion of the release mechanism.

Fig. 8 is a detail side elevation of the motor key and part of the mechanism actuated thereby.

Fig. 11 is a right hand side elevation of the machine.

Figs. 11A and 11B are details of parts shown in Fig. 11.

Fig. 12 is a top plan view, partly in section, of the means for driving the control shaft.

Fig. 15 is a detail side elevation of a portion of the three-cycle control mechanism.

Fig. 16 is a detail top plan view of part of the mechanism shown in Fig. 15.

Fig. 17 is a rear elevation of the control shaft and its cooperating mechanism.

Fig. 18 is a detail view showing another portion of the three-cycle control mechanism.

Fig. 26 is a top plan view of the printing mechanism showing the slip carrying table and the line selecting keyboard.

Fig. 27 is a vertical section through the slip carrying table and its cooperating mechanism.

Fig. 28 is a detail view of the mechanism for disconnecting the slip feeding mechanism.

Fig. 29 shows the means for driving the slip feeding mechanism.

Fig. 30 is a detail of the slip tension mechanism.

Fig. 31 is a detail of the slip feeding rollers and the friction drive therefor.

Fig. 32 shows in full lines a portion of the mechanism shown in Fig. 29.

Fig. 33 is a detail top plan view of the slip feeding mechanism.

Fig. 35 is a top plan view of the lower hammers, and the means for selecting these hammers for operation.

Fig. 36 is a top plan view of the knob for predetermining the number of prints the impression mechanism will make.

Fig. 37 is a facsimile of one of the account cards, adapted to be used with this register.

Fig. 38 is a facsimile of a fragment of the record strip, which is printed by the machine shown herein.

Figure 39A:
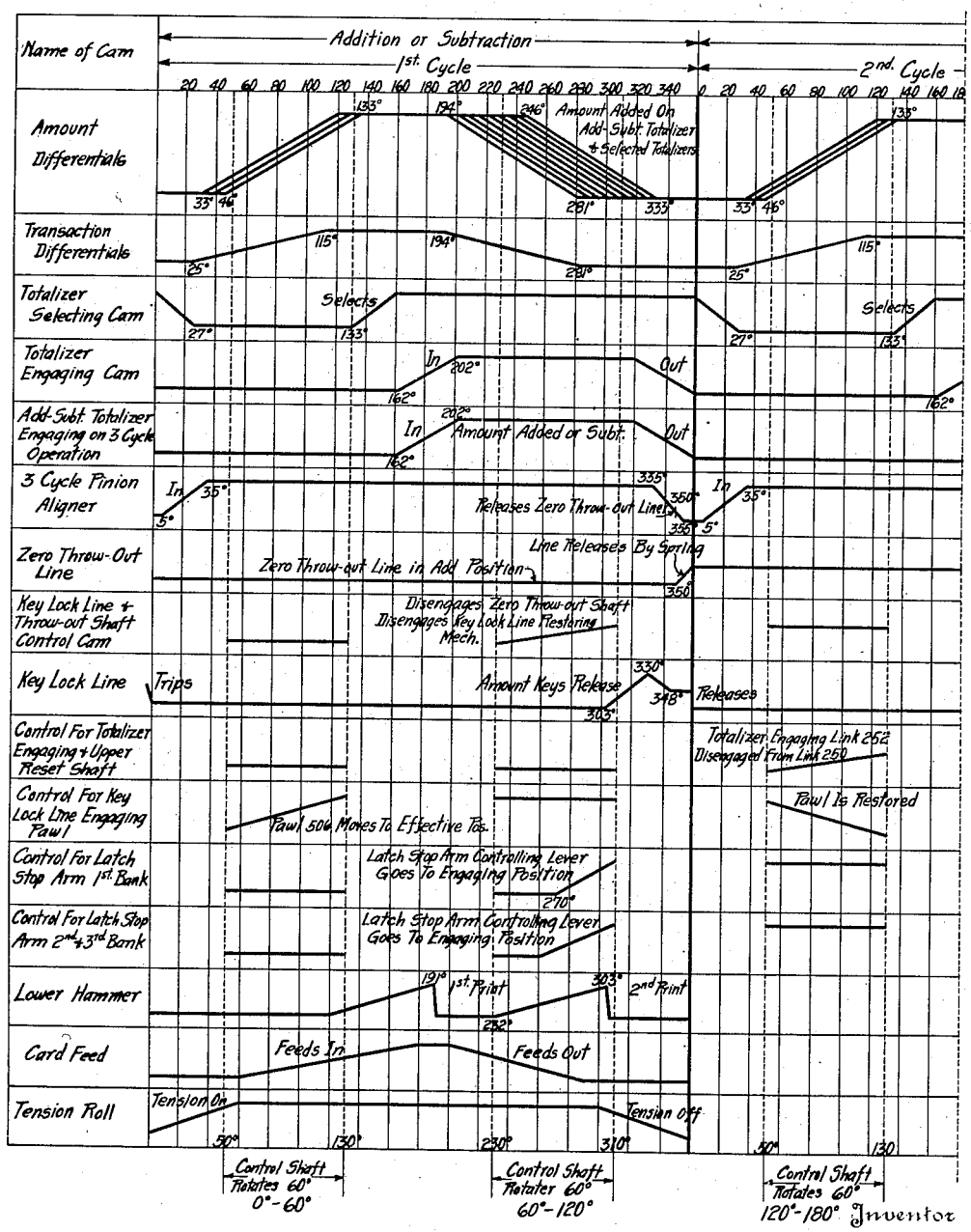
Figure 39B:
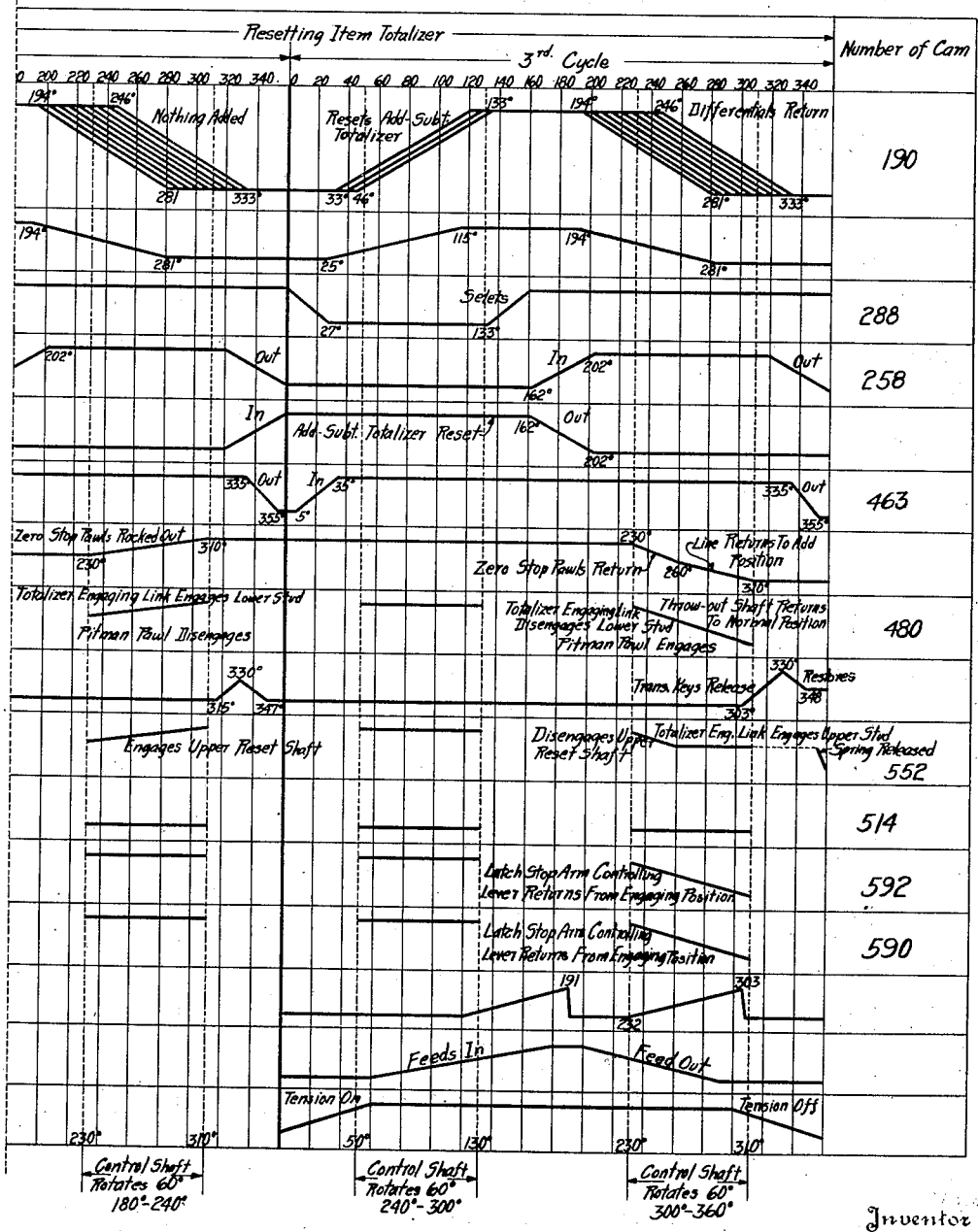

Figs. 39A and 39B together show the time chart.

General description

In the various lines of business when a continuous balance of a customer's account is desirable, machines of the type shown herein have been used with great success. Formerly in such systems, when an amount is to be either debited or credited to a cutomer's account, the operator removes the appropriate account card from the file and notes the balance thereon. The amount, whether a credit or a debit, is then set up on the keyboard and the machine operated, the amount being entered on the adding and subtracting totalizer. The new item is then set up and the machine operated again, thereby either adding, or subtracting, said new item to, or from, the previous balance, depending on the nature of the item. The total lever is then moved into its proper position, and the adding and subtracting totalizer cleared, thereby printing the new balance.

It was found, however, that this complete operation took considerable time, and therefore, applicant has provided an improvement to the existing mechanism, which considerably shortens the time necessary to complete the entire operation. This invention makes it possible to perform both the adding or subtracting operation and the total-printing operation, as one continuous operation. This is accomplished by providing means for automatically making the necessary adjustments of the mechanism before a total-printing operation which adjustments were formerly made by manually setting the total lever. It is apparent that such an arrangement greatly decreases the time required to perform the complete operation, and at the same time reduces the chances of error on the part of the operator.

The invention in no way interferes with the normal use of the machine, the totalizers of which may be employed to control the printing of totals in the usual manner, by manually adjusting the total lever to control the machine for total-printing operations.

Means is also provided for printing the entries on duplicate cards. These cards are placed in the machine one on top of the other and the mechanism has been designed so that the top card will be removed automatically from printing position and then returned to such position so that the various entries may be printed on both of said cards.

Operating means

The present machine may be operated either by an electric motor or a crank, as desired. Any suitable type of motor may be used, and none is therefore shown herein. The motor is adapted to drive a clutch shell 30 (Fig. 9), which cooperates with a mutilated clutch disc 31, loose on a stud 32. Also loose on the stud 32 and rigidly connected to the clutch disk is a gear 33, which meshes with a gear 34, supported by a stud 35, projecting from the left hand side frame of the machine. Gear 34 in turn meshes with a gear 36 fast on the left hand end of a shaft 37, supported by the machine side frames. The shaft 37 is the main drive shaft of the machine. The clutch is normally held in its disconnected condition by a lever or detent 38, pivoted on a stud 39, and normally urged in a counter-clockwise direction by a spring 40.

The lever or detent 38 is normally prevented from rocking in a counter-clockwise direction by a hooped arm 41, which lies just beneath a pin 42, carried by the said lever 38. The hooked arm 41 is fast on the left hand end of a shaft 43, which is the well-known release shaft used in machines of this type. When the machine is released for operation, in a manner which will be hereinafter described, the shaft 43 is rocked counter-clockwise, as viewed in Fig. 9, thereby removing the hooked arm 41 from beneath pin 42 on the lever 38, and permitting the spring 40 to rock this lever in a counter-clockwise direction, to disengage it from the clutch, thus permitting the rotation of the clutch shell 30 by the motor. The gear 34 carries a pin 44 adapted to cooperate with the lower end of a depending link 45, pivoted at its upper end to the lever 38, to rock the lever 38 clockwise slightly past its normal position. At this time the release shaft 43 is rocked clockwise by means later described, in order to bring the hooked end of the arm 41 beneath the pin 42, so as to hold the lever or detent 38 in its normal position.

If for any reason the electric motor is not used, the machine may be operated by a crank handle 46, shown in dotted lines in Fig. 11. This crank handle is operatively connected to a gear 47, which meshes with a large gear 48, mounted on a stud 49 in the right hand side frame of the machine. The gear 48 in turn meshes with a gear 413, (see also Fig. 12) fast on the right hand end of the shaft 37. The rotation of the crank handle 46 will, through the gear 48 and the gear 413, give the main drive shaft one complete rotation on every operation of the machine. It requires two complete rotations of the crank handle to give the main drive shaft 37, its single rotation.

Keyboard

Amount keys

Figure 1:
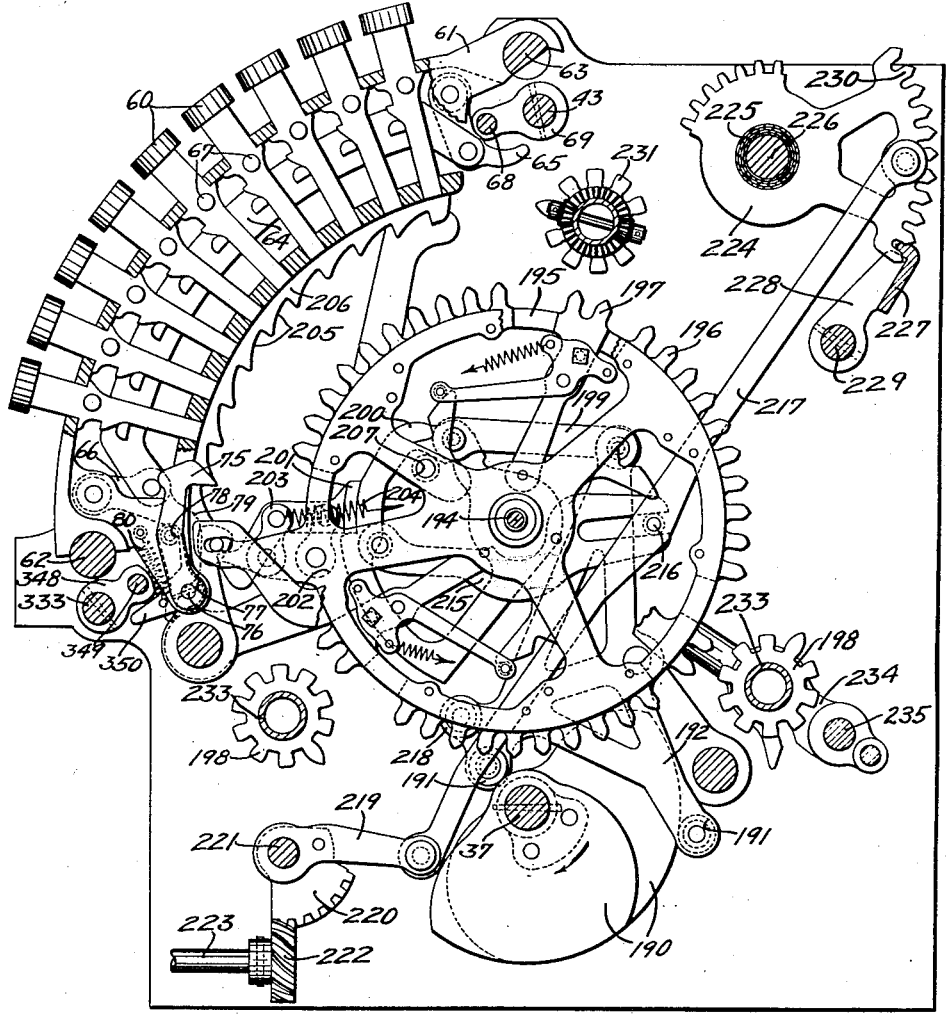
Fig. 1 is a sectional view taken on a line just to the right of one of the amount banks.
Figure 25:
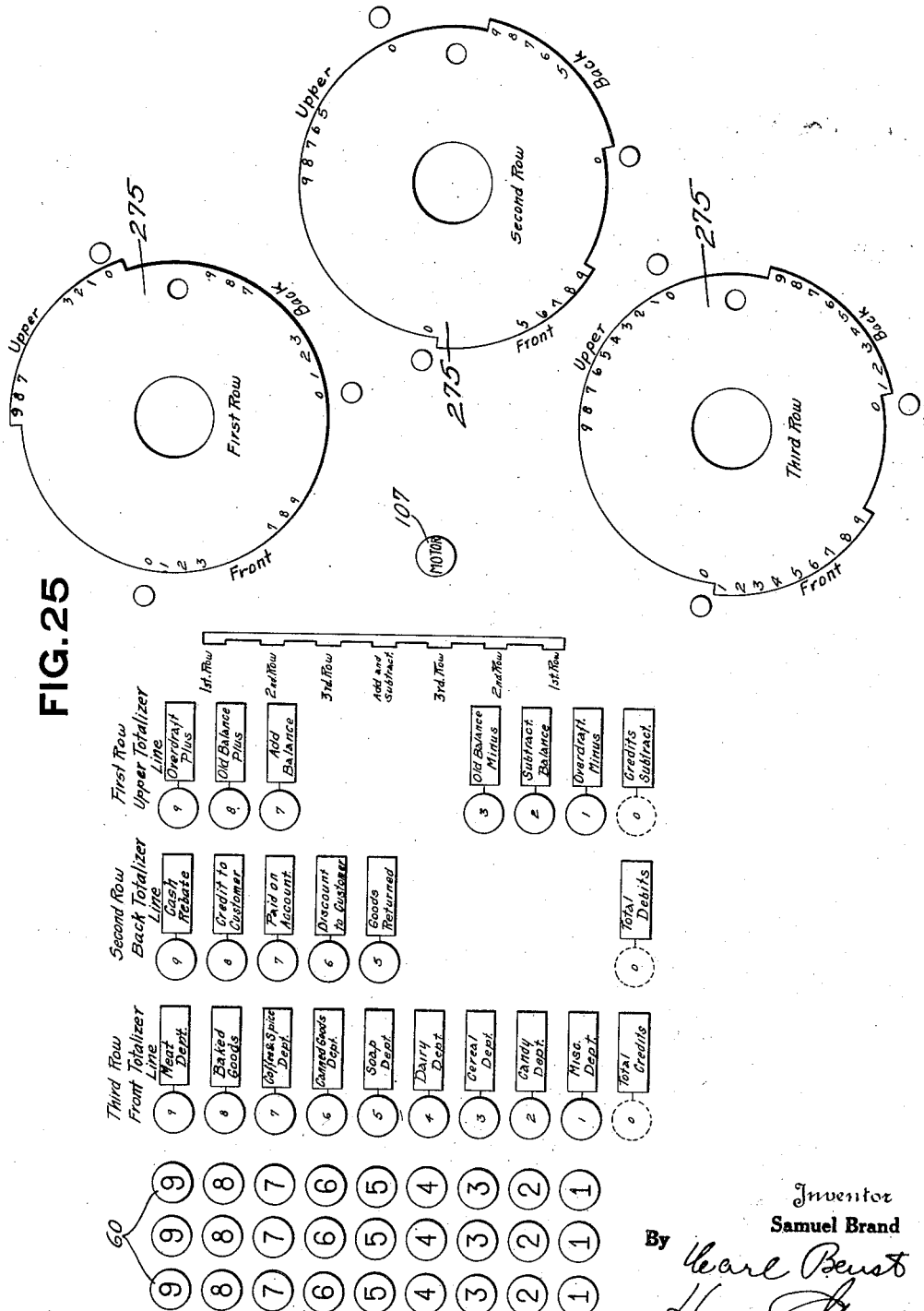
Fig. 25 is a diagrammatic view of the keyboard of the present machine, together with the three selecting plates which are adjusted by the three banks of control keys, and which select the totalizer line to be engaged.

The machine is provided with a plurality of banks of amount keys 60 (Figs. 1 and 25). Any desired number of banks may be provided in order to give the machine the desired registering capacity. These banks are identically the same as the amount banks shown and described in the above mentioned patents, and therefore but a very brief description thereof will be given herein.

The keys 60 are mounted in key frames 61, supported at their lower ends upon a rod 62, and at their upper ends upon a rod 63. Each of these keys cooperates with a detent 64 and a locking bar (not shown). The detent is supported by an arm 65 at its upper and an arm 66 at its lower end. The keys are held in their outer undepressed positions by springs not shown herein, which contact with pins 67, projecting from the shanks of the keys. Each of these keys has a shoulder, which when the key is depressed contacts a corresponding pin on the detent 64, thereby rocking said detent downwardly until the shoulder on the key has passed the pin on the detent, whereupon the detent moves upwardly under the spring tension far enough to prevent the key from returning to its normal outer position. The keys are released near the end of the operation of the machine by a universal rod 68, carried by a plurality of arms 69 fast on the release shaft 43. The rod 68 cooperates with a tail formed on the upper detent supporting arm 65, and when the shaft 43 is rocked counter-clockwise (Fig. 1) near the end of the operation of the machine, by means well known in the art and to be described later, the detent and locking bar are moved downwardly far enough to permit the shoulders on the keys to pass the pins carried by the detent, and thereby to be returned to their normal positions by their restoring springs (not shown).

Cooperating with each bank of amount keys is a zero stop pawl 75 (Fig. 1), the function of which is well known in the art. These pawls are fast on short shafts 76, mounted in the key frames 61. These shafts also carry arms 77, which support pins 78 engaged by hook ends 79, formed on the lower detent supporting arms 66. The zero stop pawls are normally in the position shown in Fig. 1, but when keys are depressed, the lowering of the detents 64, rocks the hook ends 79 clockwise which, through pins 78, arms 77 and shafts 76, rocks the corresponding zero stop pawls 75 counter-clockwise to their ineffective positions.

Each zero stop pawl is normally maintained in its effective position by a spring 80, extending between a pin on a forwardly extending tail 350 of arm 77 and a pin on the key frame 61.

Transaction keys

In this specification the banks of control keys will be referred to by number, as they extend to the left from the total lever (Fig. 25).

Figure 2:
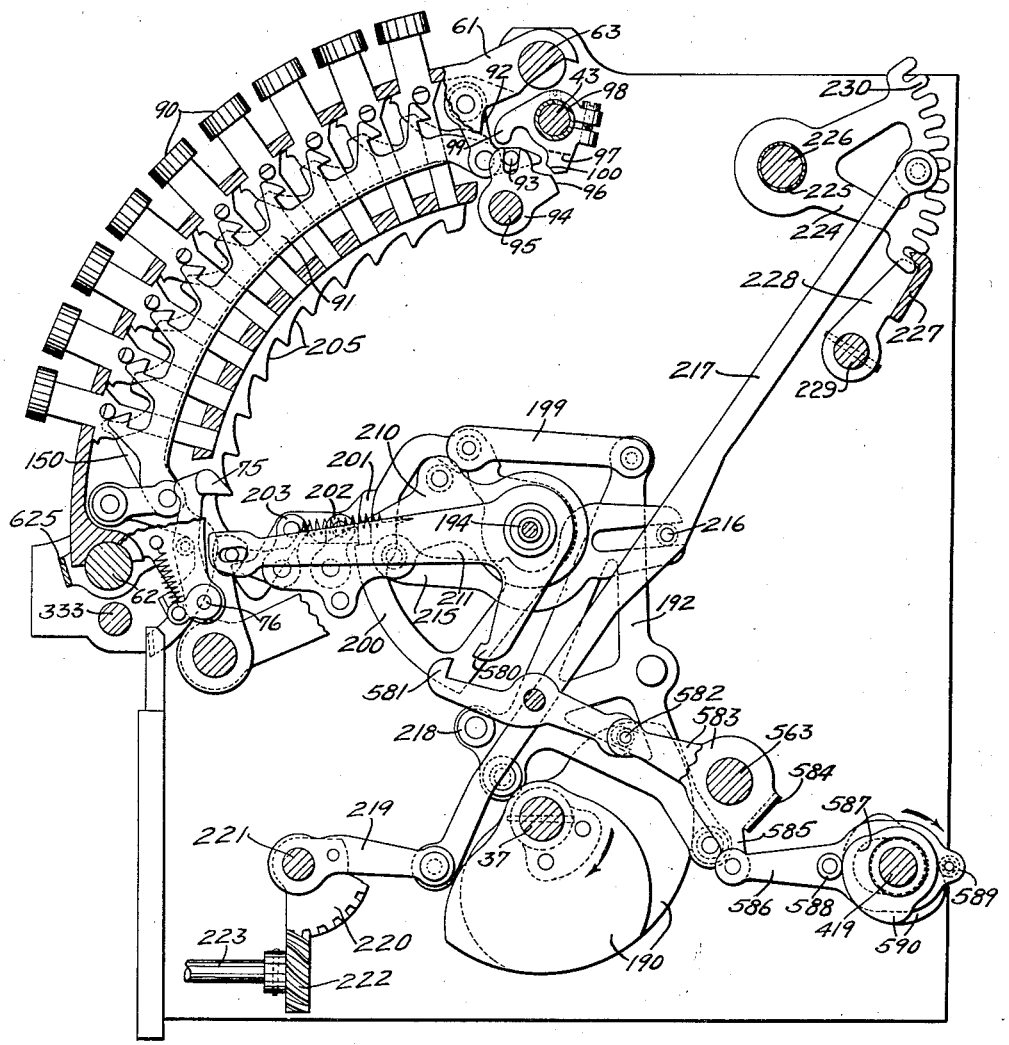
Fig. 2 is a sectional view taken just to the right of the third control bank.

Fig. 2 shows the third control bank. This bank and the second control bank are practically the same, with the exception that the second control bank contains only the five upper keys. For this reason, only the third bank is illustrated. Each of these banks has a plurality of keys 90 mounted in key frames 61, similar to the frames of the amount keys, and are supported on the rods 62 and 63 above mentioned. Each of the control keys carries a pin, which cooperates with an inclined surface on a detent 91, in a manner well known in the art. When any one of the transaction keys is depressed, the detent 91 is moved downwardly until the pin on the depressed key has passed the inclined surface, whereupon the detent moves up to its normal position and retains the key in its depressed position. The control keys are released near the end of the operation of the machine by the rocking of the release shaft 43. At its upper end the detent 91 is supported by an arm 92, which has a projecting finger carrying a pin 93. This pin is embraced by a bifurcated arm 94, loosely mounted on a shaft 95, which is known in machines of this type as the upper reset shaft, and which will be mentioned hereinafter.

The arm 94 has an edge 96, which, when the detent is lowered, cooperates with a key release arm 97 clamped to a sleeve 98, surrounding the release shaft 43. Normally the sleeve 98 and the release shaft 43 are locked together so that they move in unison. The key release arm 97 also has a tail 99 adapted to rock the detent 91 downwardly when the release shaft 43 is rocked near the end of an operation of the machine, to release the depressed control key. If one of the control keys is only partially depressed, the edge 96 of the arm 94, is in the path of a surface 100 of the key release arm 97, and thereby prevents the rocking of the release shaft to release the machine. If, however, the key is fully depressed, the detent 91 and the arm 94 return to their normal positions as shown in Fig. 2, and permit the rocking of the release shaft. Likewise after the machine has been released and the shaft 43 has been rocked clockwise, the key release arm 97 is moved into the path of the arm 94, thereby preventing the depression of any of the control keys after the machine has been released.

First control bank

Figure 4:
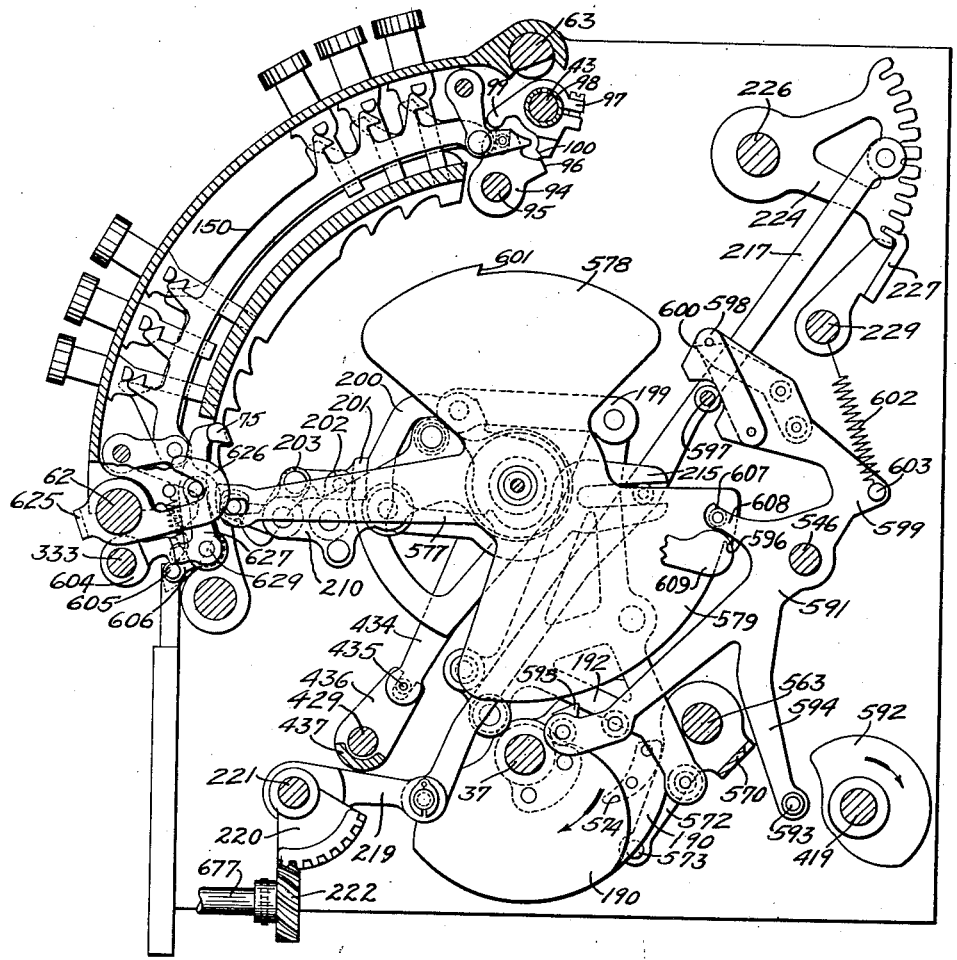
Fig. 4 is a section of the machine just to the right of the first control bank.

The first control bank is shown in Figs. 4 and 25. In general its construction is the same as that of the second and third control banks, previously described, with the exception that certain of the keys are omitted in this bank.

The special features in connection with this bank will be more fully described later on.

Total lever

Like all machines of this type the present machine is provided with a total lever 105 (Figs. 19 and 20) integral with a total lever disk 106. This disk is adapted to control the various totalizer lines on normal totalizing operations, as well as other functions which need not be discussed at present. It is sufficient here to say that the total lever disk selects the totalizer line to be rocked into engagement with the actuators on normal totalizing operations.

Motor key

The present machine is usually electrically operated and in order to facilitate the rapid operation of the machine, a motor key 107 (Figs. 8, 11 and 25) is provided, which can be struck to release the machine. The manner in which this release by the motor key is accomplished will be hereinafter described.

Release mechanism

In all machines of this type there is a release shaft, such as the shaft 43 above mentioned, adapted to be rocked in a clockwise direction (Fig. 11) by a powerful spring 115, which actuates the shaft through connections which will be hereinafter described. The spring 115 is supported by a link 116 and exerts its pressure against an arm 117 (see also Fig. 11A), fast on the release shaft 43. Two spring pilots 114, are pivoted on a stud 113 on the arm 117 and provide a connection between the spring 115 and the arm 117.

In the normal positions of the parts, the release shaft 43 is prevented from rocking under the influence of the spring 115, by the contacting of a half-round stud 118 (Figs. 6 and 7) carried by an arm 119, with a pair of pawls 120 and 121, loose on the shaft 95. It can be seen from Fig. 7 that so long as either one of the pawls 120 and 121 remains in alignment in the path of the half-round stud 118, shaft 43 cannot be rocked clockwise by the spring 115 to release the machine.

When the machine is released, as will be hereinafter described, the releasing movement of the shaft 43 is limited by the engagement of a projection 122 of the arm 117, (Fig. 11) with a pin 123 projecting from the side frame.

When the proper keys in the keyboard have been depressed, the machine is adapted to be released by the motor key 107, the shank of which has a bifurcated end 130, adapted to surround a pair of studs 131, carried by a plate 132 (Figs. 8 and 11), which is slidably mounted on a pair of studs 133 and 134, supported by the machine side frame. The plate 132 also carries a pin 135, which cooperates with the bifurcated end of one arm of a lever 136, pivoted on a stud 137 in the right hand side frame of the machine. At its opposite end the lever 136 carries a pin 138, which projects through the bifurcated end of an arm 139, loose on the shaft 95. The arm 139 is made integral with a hooked arm 140, by a yoke 141. When the motor key 107 is pressed in, the hooked arm 140 is rocked clockwise about the shaft 95. A pin 142 carried by an arm 143 is adapted to cooperate with the inner periphery of the hooked arm 140, and the arm 143 will thereby be rocked clockwise upon the clockwise movement of said hooked arm 140.

Connected to the arm 143 by a yoke 145, is a bifurcated arm 144 embracing a pin 146, carried by the pawl 120, which is the right hand one (Fig. 6) of the two pawls 120 and 121, which normally obstruct the movement of the flat stud 118, and thereby prevent the release of the machine. The pawl 121 is under the control of the keys in the control banks, and will have been rocked out of engagement with the stud 118, upon the depression of said keys, in a manner which will be hereinafter described. Therefore, when the arm 143, yoke 145 and arm 144, are rocked clockwise, it can be seen from Fig. 7 that the pawl 120 will be rocked counter-clockwise about the shaft 95, and will thereby become disengaged from the stud 118. As soon as both of the pawls 120 and 121 are raised out of the path of the stud 118, the shaft 43 is rocked clockwise by the spring 115 to permit operation of the register. The stud 118 is then positioned between the pawls 120 and 121, and another pawl 147, loose on the shaft 95, and connected to the pawl 120 by a spring 148. The pawl 147 is the well-known non-repeat pawl which prevents an immediate second operation of the register, should the motor key be held down at the end of an operation of the machine, in a normal adding operation.

Figure 5:
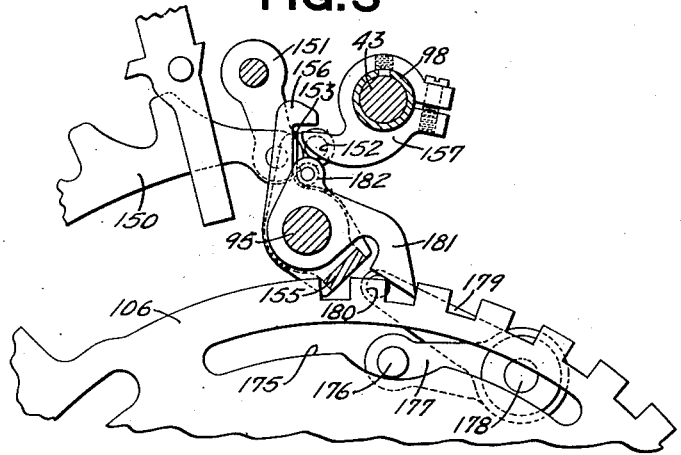
Fig. 5 is a detail enlarged section, showing various interlocks.

The means whereby the pawl 121 is rocked out of engagement with the stud 118, is shown in Figs. 5 and 6. Each of the control banks is provided with a detent 150, which at its upper end is pivoted to an arm 151, carrying a pin 152 in the plane of an upwardly extending arm 153, loosely mounted on the shaft 95. There is one of these arms 153, for each of the control banks, as can be seen in Fig. 6. These arms 153 are connected together by means of a yoke 155. The center one of the arms 153 is bifurcated and straddles the yoke 155, as shown in Fig. 6.

Also connected to this yoke is a hooked arm 156, which normally cooperates with a finger 157, clamped on the sleeve 98, surrounding shaft 43. This member 157 has a projection which lies just beneath the hooked arm 156, and thereby prevents a release of the machine, so long as this hooked arm remains in its normal position. When, however, any key of the three transaction banks is depressed, the yoke 155 is rocked counter-clockwise, due to the engagement of the pin 152 with the arm 153 of the control bank operated, and as the arm 156 is operatively connected to the yoke 155, this arm is also rocked far enough in a counter-clockwise direction, to move it from the path of the projection of the finger 157, so that the shaft 43 is free to rotate so far as the arm 156 is concerned. The first and second keys from the bottom in the first control bank do not cooperate with detent 150 to release the machine, as this detent when moved will rock out the zero stop pawl for the first bank. It is not desired to have this happen when these keys are depressed, and therefore, other mechanism to be described later cooperates with these keys to permit the release of the machine.

The yoke 155 has a pin (not shown), which cooperates with a forked arm 158 of a yoke 163, (Fig. 6), loose on the shaft 95. At its left hand end this yoke 163 is integral with the pawl 121. It can be seen therefore, that whenever the yoke 155 is rocked as above described, due to the depression of one of the control keys, the yoke 163 is also rocked to a corresponding extent.

This movement of the yoke 163 will move the pawl 121 out of engagement with the flat side of the stud 118, and thereby permit the release of the machine when the motor key is depressed.

On totalizing operations it is sometimes desired to operate the machine without depressing any control keys, and for this reason mechanism is provided under the control of the total lever disk 106, to rock out the pawl 121 and the hooked arm 156, whenever the total lever disk is moved from its normal adding position. A slot 175 is cut near the top of the total lever disk 106 (Fig. 5) and into this slot projects a pin 176, carried by an arm 177, fast on a shaft 178, (see also Fig. 6).

Also fast on this shaft is an arm 179, which has a pin 180 lying beneath an arm 181, loose on the shaft 95. The arm 181 carries a pin 182 adapted to engage the arm 156. From the above description it can be seen that when the total lever disk is moved out of its adding position, the arm 177, shaft 178 and arm 179 are rocked slightly clockwise. Due to the engagement of the pin 180 with the arm 181, this arm and the pin 182 are rocked counter-clockwise about the shaft 95. This movement, due to the engagement of the pin 182 with the arm 156 will rock said arm counter-clockwise out of the path of the finger 157, and the pawl 121 out of the path of the stud 118, as previously described.

Differential mechanism

The differential mechanism of the machine is employed to select the different totalizers for operation, to operate the selected ones, and also to set type carriers in the printing mechanism, as controlled by the various banks of keys. The amount differential mechanism will be described first.

Amount differential unit

There is one complete differential unit for each amount bank, but as they are all identical in construction and operation, only one will be described herein.

To drive the differential mechanism of the machine, the drive shaft 37 is provided with a plurality of pairs of cams 190, (Fig. 1), each pair cooperating with rollers 191, carried by a Y-shaped lever 192, of which there is one for each bank of keys in the machine. Each of these levers 192 is pivoted on a corresponding frame (not shown), but of well-known construction. Loosely mounted on bushing 194, carried by the differential supporting frame just mentioned, is a differentially movable actuator 195, carrying racks 196, and transfer arms 197, for operating the totalizer pinions 198. The levers 192 at their upper ends are connected by links 199, to driving segments 200, loose on the bushings 194. The driving segments 200 appropriate to the banks of amount keys, are connected to the differentially movable actuators 195 by latches 201, each of which is supported by an arm 202, and a bell crank 203, pivoted on the corresponding differentially movable actuator.

The springs 204 hold the rear ends of the latches in engagement with shoulders on the driving segments. When the segments 200 are driven by their cams 190, the differentially movable actuators 195 are carried with their latches, up to points where the forwardly extending arms of the bell cranks 203 engage the inner ends of the depressed amount keys. Such engagement results in disengagement of the latches from the driving segments, and engagement of the forward end of each latch with the particular one of a series of notches 205, formed in a plate 206, supported by the differential supporting frame, which is opposite of the latch when it is disengaged. Upon return movement of the driving segments to normal positions, a pin 207 on each of the differentially movable actuators 195, is engaged by the inside of its driving segment 200, and said actuators 195 are returned thereby to their normal positions.

If a key is not depressed in an amount bank, the zero stop pawl 75 therefor operates the latch to arrest the differentially movable actuator in its zero position. However, when a key is depressed, the zero stop pawl is moved out of its operative position in the well-known manner, as has been above described.

*Control bank differential mechanism*

As the three control banks serve to select the totalizers but not to accumulate thereon, no differentially movable racks are used in connection with these banks. With the exception of this fact, however, the differential mechanisms for these banks are substantially identical with that shown and described in connection with the amount banks, and the same reference numerals will be used to indicate like parts.

It can be seen from Fig. 2 that there are two cams 190, driving a Y-shaped lever 192, which is in turn connected by a link 199, to a driving segment 200. This driving segment cooperates with a differentially movable arm 210, which carries a latch 201, identical with the latch 201 for the amount banks, and which is supported by an arm 202 and a bell crank 203. When the cams 190 are rotated, the segment 200, through link 199 and the Y-shaped lever 192, will raise the differentially movable arm 210, due to the engagement of the latch 201, with a shoulder on said driving segment, until the outer end of the bell crank 203 comes into contact with whichever one of the keys in these banks is depressed. When this occurs the latch 201 will be moved forwardly out of engagement with the shoulder, and the forward end of said latch will engage one of a plurality of notches 205, as above described.

If no key in the transaction bank is depressed, the zero stop pawl 75 therefor, will be engaged by the end of the longer arm of a bell crank 211, pivotally mounted on the bushing 194, and which at its forward end has a slot through which projects a pin carried by the bell crank 203, and will thereby cause this lever to be rocked in order to disengage the latch for this bank in the zero position, as in the amount banks.

Special means are provided for disengaging the latches in the zero position of the second and third control banks in three-cycle operations. These devices will be described in detail in connection with the description of this operation. If any key in either the second or third control bank is depressed, the zero stop pawl therefor will be rocked to ineffective position. The zero stop pawl appropriate to the first control bank, is operated by mechanism which will be hereinafter described.

Connected to the differential mechanism of each amount bank and each control bank, is a beam 215, pivoted at one end to the differentially movable actuator 195, or arm 210, and bifurcated at its opposite end to straddle the roller 216, carried by a link 217. The beam 215 is adjusted by a roller 218, carried by the Y-shaped lever 192, in a well-known manner. At its lower end each of these links 217 is pivoted to an arm 219 fast on a spiral segment 220, loose on a rod 221, supported by the machine side frame. These spiral segments 220 mesh with spiral gears 222, fast on the inner ends of shafts 223 which through mechanism well known in machines of this type, set up the type wheels for printing the amounts and other data on the various record retaining means.

At their upper ends the links 217 are pivoted to segments 224, fast on concentric sleeves 225 and on a shaft 226 supporting said sleeves. An aligning bail 227, carried by a plurality of arms 228, fast on a shaft 229, is adapted normally to engage teeth 230, formed on the segments 224. When the differential mechanism is operated, the aliner 227 will have been moved out of engagement with the teeth 230, and when the differential movement is completed, it will again be moved into engagement therewith, to properly align and hold the various mechanisms set up by the differential mechanisms, in their set positions. The means for operating the aligner 227 is old and well-known in the art, and it is not, therefore, either shown or described herein.

Totalizers

The totalizers used in the present machine are old and well known in the art, and therefore, no detailed description of them will be given herein. If such a description is desired, reference may be had to the patents previously mentioned.

There are three lines of totalizers in the machine. Two of these lines, that is, the front and back lines, consist of a plurality of groups of totalizer pinions 198, each loosely mounted on a tube 233 supported at each end by suitable frames 234 (Fig. 1). These frames are slidably mounted on shafts 235 supported in plates 236 (Fig. 22) secured to the machine side frames. Each totalizer consists of a plurality of pinions 198, there being one pinion in each group of pinions. If the first pinion of each group is engaged with the differential actuators, a certain totalizer will be actuated. If the second pinion in each group is actuated, a different totalizer will be operated, etc.

The upper totalizer line carries an adding and subtracting totalizer, there being but the one totalizer on this line. This totalizer includes a plurality of totalizer wheels 231 (Fig. 1), mounted in pairs and having bevel gears fastened on their adjacent sides as is well known. Two bevel pinions are so disposed as to mesh with both the bevel gears of a pair of totalizer wheels in such a manner that the movement of one of the totalizer wheels in one direction will rotate the other one of the pair in the opposite direction, as is well known. The pairs are so spaced on the shaft that the subtracting wheel of each pair is normally in alignment with the actuators. When the subtracting wheels are engaged, an amount will be subtracted from the adding wheels, and when the totalizer is shifted to bring the adding wheels into engagement with the actuators, an amount will be added to these wheels. In other words it is evident that if one of the totalizer pinions is rotated, the other pinion of the pair will be rotated in the opposite direction, so that when the subtracting pinions are in mesh with the actuating segments, the adding pinions will be actually turned backwards extents corresponding to the movements given the subtracting pinions by the actuating racks 196.

Means are provided in the present machine for transferring from totalizer wheels of lower order to those of higher order, but as this mechanism is identical with that described in the beforementioned patents no description thereof will be given herein.

Totalizer selecting mechanism

It is well known that in machines of this type, the totalizer desired to be actuated is selected and moved into position to be engaged with the actuators by shifting the entire totalizer line laterally of the machine. This lateral shifting of the totalizer line is under the control of the keys in the three control banks. That is, the first control bank controls the shifting of the upper totalizer, which is the adding and subtracting totalizer, from its normal or subtracting position to its adding position, or vice versa. The second control bank controls the shifting of the back totalizer line, which in the present case carries six totalizers. The front totalizer line is controlled as to lateral shifting by the third control bank. The mechanism for accomplishing this lateral shifting is not shown herein, as it is well known and is described in detail in the patents previously mentioned.

Totalizer engaging mechanism

Figure 22:
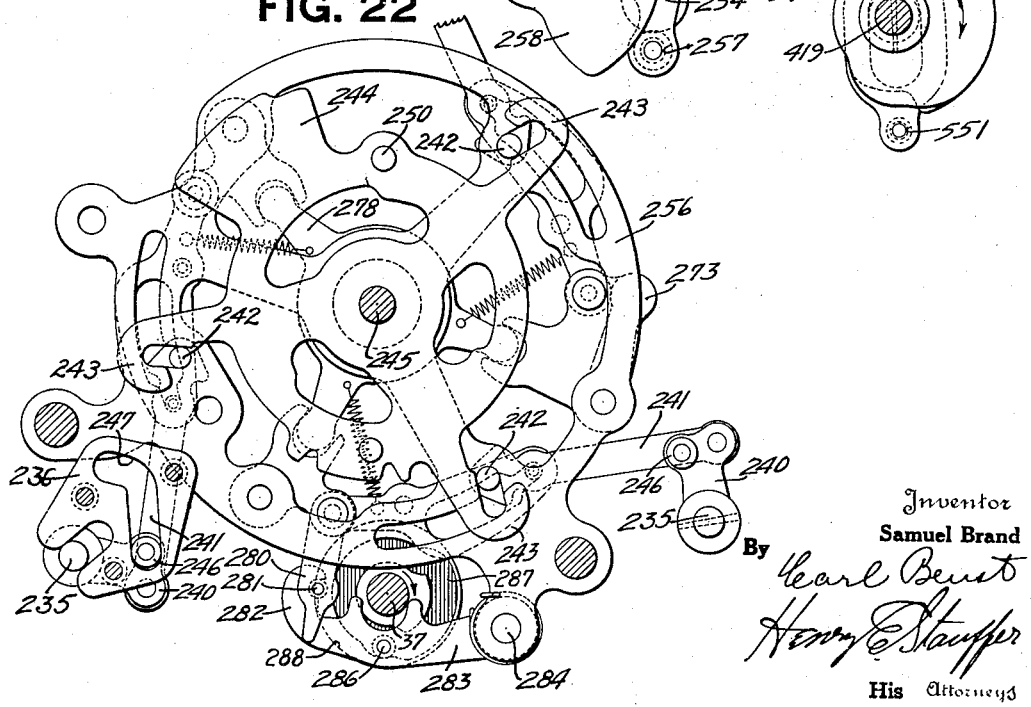
Fig. 22 is a side view of the totalizer engaging mechanism.

The mechanism for engaging the totalizer lines with the actuators, after the desired totalizers have been selected by sliding the totalizer lines laterally of the machine, is old and well known, and only a brief description thereof will be given herein. The mechanism concerned is best shown in Fig. 22.

Fast on the right hand end of each of the totalizer supporting shafts 235, is an arm 240, to which is pivoted one end of a link 241. At its opposite end, the link 241 carries a pin 242, which may be engaged with an appropriate hook 243, projecting from a totalizer engaging disk 244, rotatably mounted on a stud 245. Each of the arms 240 carries a roller 246. These rollers are adapted to cooperate with cam slots 247, formed in the plates 236, which are secured to the side frames of the machine, for the purpose of supporting the totalizer lines. The disk 244 is rocked first clockwise and then counter-clockwise, as viewed in Fig. 22, by mechanism which will be hereinafter described, and if the pin 242 of any one of the links 241 has been moved into engagement with the hook 243 of disk 244, it is evident that the arm 240 will be rocked counter-clockwise, and will, due to the conformation of the cam slot 247 in plate 236, move the shaft 235, and the totalizer line appropriate thereto, inwardly toward the center of the machine, thereby engaging the totalizer wheels selected for operation with the differential actuators, in a manner well known in the art.

Figure 21:
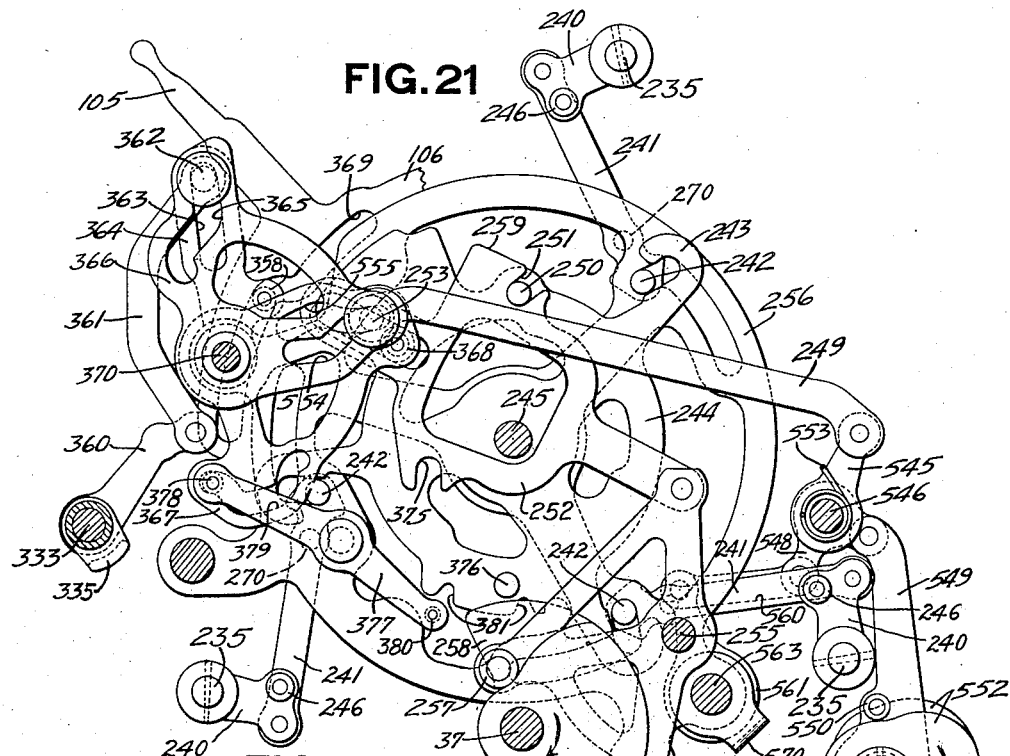
Fig. 21 is a detail side elevation of a portion of the totalizer control mechanism.

The means for rocking the disk 244 clockwise and then counter-clockwise to engage the selected totalizer line is best shown in Fig. 21, and will now be described. The disk 244 carries a pin 250 projecting therefrom, which normally lies in a notch 251, formed in a link 252, which at its left hand end is supported by a stud 368, carried by an arm 367. The stud 368 passes through an elongated slot in the link 252, so as to enable the link to move endwise in the direction of its length.

At its right hand end the link 252 is pivoted to the upper end of a lever 254 pivoted at 255 to a supporting frame 256. The lever 254 carries a pair of rollers 257, which cooperate with a pair of cams 258, fast on the main drive shaft 37 of the machine. The cams 258 are given one complete clockwise rotation during each adding operation of the machine, and they will rock the lever 254 first clockwise and then counter-clockwise to normal position. The clockwise movement of the lever 254 shifts the link 252 to the right, and due to the connection between this link and the disk 244, the disk is rocked clockwise, thereby engaging whichever one of the totalizer lines has been selected.

On the counter-clockwise movement of the lever 254, the link 252 is moved to the left, thereby returning the disk 244 in a counter-clockwise direction to its normal position, and also returning the totalizer line or lines, which were engaged, to their normal disengaged positions.

*Engaging controlling mechanism*

Figure 23:
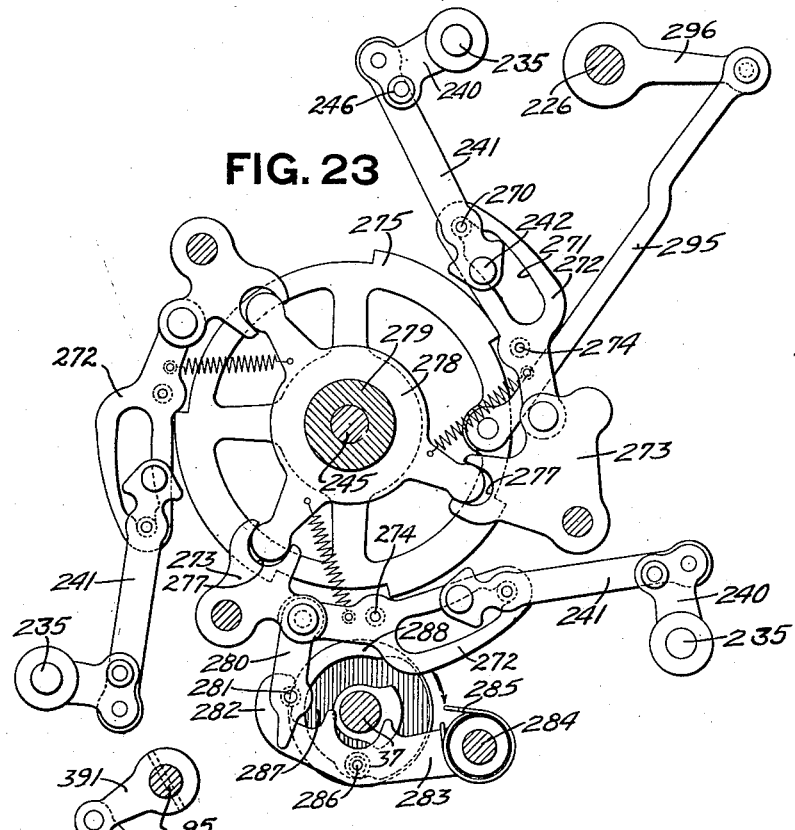
Fig. 23 is a detail side elevation of the mechanism for selecting the totalizer line to be engaged.

It has been stated already herein, that in order to engage any totalizer line with the actuators, the pin 242 carried by the link 241 (see Figs. 21 and 22), must be moved into engagement with the hook 243 appropriate thereto, on the disk 244. The mechanism provided for controlling and moving these pins to their engaging or disengaging positions, is shown in Figs. 21, 22 and 23. This mechanism is old, and is shown in several of the patents above referred to, and therefore the description herein will be made as concise as is consistent with clarity.

The mechanism for controlling the engaging of each of the three totalizer lines is the same, and therefore, the description of the mechanism appropriate to one of the lines is thought to be sufficient for all.

Each of the links 241 (Fig. 23), carries a pin 270, each of which cooperates with a slot 271, formed in an arm 272, pivoted on a bell crank 273. The bell crank 273 is in turn supported by the frame 256, above mentioned. The arm 272 carries a pin 274, which is adapted to cooperate with the peripheries of three substantially circular plates 275 (Fig. 25) loosely mounted on a hub 279 surrounding the stud 245. The peripheries of these plates are formed with either high spots or low spots in positions to cooperate with the pin 274. If one of the high spots on any one of the three plates 275, is in position to cooperate with the pin 274 of one of the arms 272, the totalizer line appropriate to this arm will be engaged with its actuator. If the plates 275 are so adjusted that there are three low spots opposite the pin 274, for any particular one of the arms 272, then the totalizer line appropriate thereto will not be rocked into engagement.

The means whereby this operation is accomplished will now be described.

Each of the bell cranks 273 has a notch 277 formed therein, into which projects one arm of a three-armed spider 278, which is free on the hub 279, surrounding the stud 245. The lower one of the bell cranks 273, as shown in Fig. 23, has pivoted thereto a short link 280, which at its lower end has a pin 281, cooperating with a hook 282, formed on or carried by a lever 283. The lever 283 is loosely mounted on a stud 284, and is acted upon by a torsion spring 285, which constantly tends to rock said lever in a counter-clockwise direction. The lever 283 carries a roller 286 projecting into a cam groove 287, formed in a cam disc 288, fast on the main drive shaft 37 of the machine. The cam 288 receives one complete clockwise rotation during each adding movement of the machine, and due to the shape of the cam groove 287, the lever 283 is rocked clockwise against the tension of the spring 285. This movement of the lever 283 will, through the link 280, rock the lower bell crank 273 to which it is pivoted, in a counter-clockwise direction. The counter-clockwise movement of the bell cranks 273 is transmitted by means of the spider 278 to the bell cranks 273 corresponding to the upper and front totalizer lines.

When the bell crank 273 is rocked counter-clockwise (Fig. 23) as above described, the movement of the arms 272 will depend on the positions of the three plates 275. If these plates are so positioned that none of them have high spots in the paths of the pins 274, then it is evident that the arms 272 will be rocked clockwise about the pins 270, and the links 241 will not be moved. If on the other hand, one of the plates 275 is so positioned that a high spot on its periphery is in contact with the pin 274, then it can be seen that when the bell crank 273 is rocked counter-clockwise, the arm 272 will be rocked with the pin 274 as its fulcrum, and the other end of the arm 272, with which the pin 270 on the link 241 engages, will be rocked in such a manner as to rock the link 241 counter-clockwise about its pivot on the arm 240. The counter-clockwise movement of the link 241 will position the pin 242 within the hook 243 (Fig. 21) of the disk 244, and therefore when the disk 244 is rocked as above described, the totalizer line appropriate to the link 241 so engaged, will be rocked into position to cooperate with the differential actuators.

Pivoted to each of the plates 275 (Figs. 23 and 25) is the lower end of a link 295, which at its upper end is pivoted to an arm 296. The arms 296 are connected by means of the shaft 226 and the sleeves 225 (Fig. 2), with the first, second and third control banks, each control bank having one of the plates 275 appropriate thereto. The differential movement given to each of the differentially movable arms of the control banks is transmitted through the above described connection, to its appropriate control plate 275, and the plate is thereby adjusted to a position in which it will determine whether or not the totalizer lines will be rocked into engagement with the actuators.

It is thought that one or two examples of the action of the selecting plates and the mechanism cooperating therewith when the different keys are depressed, will be helpful in obtaining an understanding of the mechanism. The outlines of the three selecting plates are shown in Figs. 25. As a first example, suppose that the ninth key in the third control bank is depressed and the motor key operated. The selecting plate corresponding to the third control bank will be moved to its nine position. The selecting plate for the second control bank will remain in its zero position. The plate corresponding to the first control bank will go to its ninth position as will hereinafter be explained and it can be seen that the following selection will be made: On the plate appropriate to the first bank, which goes to its nine position, the nine position for the front totalizer line is a low spot. On the plate appropriate to the second bank, which remains in its zero position, it will be noted that in the section appropriate to the front totalizer line, the zero position is a low spot, and in the plate appropriate to the third control bank it will be noted that there is a high spot in the nine position for the front totalizer line, and therefore the front totalizer line will be engaged.

Considering next the back line, it will be noted that in the plate appropriate to the first bank, the nine position of the back line is a low spot. In the plate for the second bank, the zero position of the back section is a low spot. The plate appropriate to the third bank is moved to its nine position, and it will be noted that the nine position in the back totalizer section of this plate is a high spot, and therefore the back totalizer line will be engaged, as it is desired to add the amount to the group total, or total debit totalizer, which is in the zero position of the back totalizer line.

With regard to the upper totalizer line, it will be noted that the nine position of the upper section of the plate, appropriate to the first bank, is a high spot. It will be noted that the zero position of the section of the plate appropriate to the second bank is a low spot. It will also be noted that on the plate appropriate to the third bank, which is moved to its nine position, the nine position of the upper section is also a low spot, and therefore the upper totalizer line will be engaged with the actuators, as it is desired to either add or subtract the amounts entered to or from the old balance.

Another example will be given, in order to make the operation plain. Suppose for instance that the five key in the third bank is depressed, and the seven, or add-balance key in the first bank. The seven key in the first bank is a three-cycle key therefore after the amount has been added into the selected totalizers the upper totalizer will be automatically cleared and reset. Consider first the adjustment of the plates with reference to the upper totalizer line on the first cycle of operation. The plate corresponding to the first bank will be moved to the seventh position, and in the section corresponding to the upper totalizer, it will be noted that the seventh position is a high spot, and therefore the upper totalizer line will be rocked in. It is not necessary to consider the position of the other plates with respect to the upper line, as it would make no difference whether the other positions are high or low, as it takes only one high spot to cause a totalizer to be engaged with its actuators.

Considering next the front totalizer line, it will be noted that in the plate corresponding to the first bank, which is moved to the seventh position, this position of the front section is a low spot. The plate corresponding to the second bank remains in its zero position, and the zero position of the section corresponding to the front totalizer is a low spot. The plate corresponding to the third bank is moved to its five position, this position of the front section is a high spot, and therefore the front totalizer will be rocked into engagement.

Consider next the back totalizer line. The plate corresponding to the first bank, which is moved to its seven position, is constructed with a low spot in this position. The plate corresponding to the second bank has a low spot in the zero position of the section corresponding to the back totalizer line. The plate of the third bank has a high spot in the five position to which it is moved and therefore it is evident that the back totalizer line will also be rocked into engagement. In this way it is evident that all three of the totalizer lines will be rocked into engagement with the totalizer actuators on the above described operation.

Mechanism is provided, as will be hereinafter described, for automatically disengaging the latches of the second and third control banks in their zero positions on the second and third cycles of a three-cycle operation. Reference to Fig. 25 shows that the selector plates for these banks have low spots in the zero position opposite all three totalizers. Therefore on the totalizing cycles of a three-cycle operation the upper totalizer only will engage under the influence of the plate associated with the first control bank. The latch for this bank is disengaged in either the first or the seventh position on total taking operations by means hereinafter to be described, therefore as the plate 275 has a high spot in both of these two positions opposite the upper totalizer this totalizer will be engaged and reset.

It is not believed that it will be necessary to give any other examples of the action of these plates, inasmuch as the invention does not lie therein in the present application, and they are shown and described in detail in certain of the patents previously mentioned.

Normal Totalizing Operation

Control of differential mechanism

When any desired totalizer is to be cleared or reset to zero, the total lever is moved downward from its normal adding position to one of three totalizing positions, the positions depending upon in which bank of control keys the selected key happens to be. The key appropriate thereto in the control bank is depressed. The motor key is then depressed and the machine will proceed to operate through two cycles of the main drive shaft, this being necessary in order to provide sufficient time. The movement of the total lever out of its adding position will lock out all of the amount keys and will control mechanism to rock out the zero stop pawls for the amount banks.

The totalizer appropriate to the key depressed, is selected in the usual manner, and the totalizer line to be engaged is selected by the movement of the total lever, in a manner which will be hereinafter described. The selected line is engaged with the actuators at the beginning of the operation of the machine, and therefor when the differential actuator moves in its clockwise direction, as viewed in Fig. 1, the totalizer wheel with which it is in engagement, will be moved backwardly until it reaches its zero position. There is a long tooth on the totalizer wheel in its zero position, which is adapted to actuate mechanism not shown herein for disengaging the latch of the differential mechanism, when the differentially movable actuator has moved to a position corresponding to the number of units on the totalizer wheel being reset. After the totalizer wheels have been reset to zero, the totalizer line is disengaged from the actuators and the differential mechanism is returned to its normal position in the regular manner, without having any effect on the totalizer.

The mechanism whereby the register is given two complete cycles of operation in totalizing operations instead of the one cycle necessary in adding operations, in order to read or reset the totalizers to zero, will now be described.

At the end of a normal adding operation, the release shaft 43 is rocked in a counterclockwise direction slightly past its normal position, and then back to normal, by the following mechanism.

Pivotally mounted on a stud 300 (Fig. 11) is an arm 301, which carries a pin 302, normally abutting against a shoulder 303, formed on a coupling lever 304, which is pivoted to the link 116, previously mentioned. The arm 301 carries a roller 306, projecting into a cam groove 305 formed in the side of the large gear 48. It will be remembered that this gear is given a one-half rotation on each adding cycle of operation of the machine. The cam groove 305 rocks the arm 301 clockwise and then counter-clockwise to normal position, just at the end of each cycle of operation. On the clockwise movement of the arm 301, the pin 302 will strike the shoulder 303 of the coupling lever 304, and cause the link 116 to be moved downward, thereby rocking the shaft 43 counter-clockwise. This movement of the shaft will release the depressed keys, and hold the motor locking lever 38, (Fig. 9) in its restored position, to which it has been moved by the stud 44 and pitman 45.

Slidably mounted on the stud 49, (Fig. 11) is a link 308, which carries a roller 309, projecting into a cam groove formed in a cam 310, which on adding operations is inactive, but which on totalizing operations is rendered active by the movement of the link 308 to the left. The means whereby this link is moved to the left will be presently described. When this movement occurs at the beginning of a totalizing operation, the cam 310 is rendered active, and during the rotation of this cam the groove is so designed that the link 308 will be given a still farther movement toward the left, as viewed in Fig. 11. At its right hand end the link 308 carries a pin 311, which projects through a slot cut in the link 116, and therefore, when the pitman 308 is moved toward the left, the link will be rocked about its pivotal point 113. This movement of the link will cause the pin 302 on arm 301, to assume a position in the right hand side of an opening 312, formed in said link, and therefore when the arm 301 is rocked clockwise at the end of the first cycle of operation, the pin 302 will move downwardly idly in the opening in link 116, and the release shaft 43 will not be moved. During the second cycle of operation, however, the cam groove in the cam 310 will shift the link or pitman 308 toward the right towards its normal position to return the link 116 to a position in which the pin 302 is immediately above a shoulder 313 on the link 116. Therefore, when the arm 301 rocks clockwise at the end of the second regular cycle of operation, the pin 302 strikes the shoulder 313 and moves the link 116 downwardly, and thereby rocks the release shaft 43, in order to release the depressed control keys, and lock the motor locking lever 38 in its normal position. It is not necessary to move the release shaft 43 as far to release the control keys as it is to release the amount keys. No amount key can be depressed when the total lever is out of its add position, and the lesser movement given the shaft 43 by the stud 302 when it strikes the shoulder 313 is sufficient to release the control keys.

The pitman 308 receives its first movement from the total lever, when this lever is moved out of its adding position, and this mechanism will now be described. The total lever disk 106 (Fig. 20) has a slot 325, through which a pin 326, carried by a lever 327 projects. The lever 327 is loosely mounted on a stud 328. Also loose on the stud 328 is an arm 329, which has a cam slot 330 formed therein. Projecting into the cam slot 330 is a pin 331, carried by an arm 332, which is loose on a shaft 333 supported by the machine side frames. When the total lever disk is rocked clockwise or counter-clockwise by the total lever 105, the cam slot 325 formed in the disk rocks the lever 327 counter-clockwise. This movement of the lever 327 is transmitted through a coil spring 334, to the lever or arm 329, which is rocked also counter-clockwise about the stud 328.

Due to the shape of the cam slot 330 in the arm 329, the arm 332 is rocked in a clockwise direction, upon the movement of the total lever. The arm 332 is connected by a yoke 335 (Fig. 16) to a hub 336, to the opposite end of which is secured an arm 337 (Figs. 11 and 15), also loose on the shaft 333.

Pivoted to the arm 337 is a link 338 (Figs. 11 and 15), which at its upper end is pivoted to a lever 339, loosely mounted on the stud 300. The opposite end of the lever 339 is pivoted to the left hand end of the pitman 308. It can be seen from the above description, therefore, that when the total lever 105 is moved out of its adding position one way or the other, the arm 332 is rocked clockwise, and therefore the arm 337 is rocked in the same direction. The clockwise movement of the arm 337, through the link 338, rocks the lever 339 clockwise, and moves the link 308 to the left, in order to render the cam groove in the cam 310 effective, as above described.

It has been previously stated that the movement of the total lever out of its adding position controls mechanism for rocking all of the zero stop pawls to their ineffective positions, with the exception of those for the control banks. This is done in the following manner.

It can be seen from Fig. 15 that the arm 337 has a notch 345 formed therein. Engaging with this notch is a nose formed on the end of a pawl 346, which is pivotally mounted on stud 351 on the end of an arm 347, fast on the shaft 333. A torsion spring surrounds the shaft 333, and bears on the pawl 346, in such a manner as to constantly tend to hold said pawl in engagement with the notch 345. It can be seen from the above that when the arm 337 is rocked clockwise by the movement of the total lever out of its adding position, the pawl 346 and arm 347, which are connected to the arm 337, are also rocked clockwise, thereby rocking the shaft 333 to a like extent. Fast on the shaft 333 are a plurality of arms 348, (Fig. 1) which carry a rod 349, which extends laterally across all of the banks of amount keys.

Integral with each of the arms 77 (Fig. 1) is a forwardly extending tail 350, which normally lies just beneath the rod 349. It can, therefore, be seen that when the shaft 333 is rocked clockwise by the movement of the total lever, the rod 349 will contact with all of the tails 350. This movement of the shaft 333 is not sufficient to move the pawls 75 to their ineffective positions. When, however, toward the end of the first cycle of a total taking operation the shaft 333 is given an additional movement, hereinafter to be described, the arm 77 and the shaft 76 are rocked farther counter-clockwise thereby moving the zero stop pawls 75 to their ineffective positions. The zero stop pawls are held in their ineffective positions until near the end of the second cycle of a totalizing operation, when the shaft 333 is partially restored, thereby permitting the zero stop pawl springs to return them to their normal effective positions.

*Normal method of changing timing of totalizer engaging mechanism on totalizing operations*

It will be recalled that on adding operations the totalizer engaging mechanism rocks the selected totalizer line into engagement with the actuators, after the differentially movable actuator has moved upwardly to its full extent. On totalizing operations it is necessary to rock the selected totalizer line into engagement with the actuators, immediately upon the start of the operation, as it is the upward movement of the differentially movable actuator, which rotates the totalizer wheels backwardly to their zero position. The means whereby this function is accomplished on totalizing operations, in which the total lever is used, will now be described.

It will be recalled that when a total lever is moved out of its adding position, the shaft 333 (Fig. 11) is rocked clockwise. This movement of the total lever through the arm 337, link 338 and lever 339, moves the link 308 to the left and renders the cam 310 active. Then upon the operation of the machine, the link 308 is given an additional movement toward the left by the cam 310, and through the lever 339, link 338 and arm 337, which is connected at this time by the pawl 346 and arm 347, with the shaft 333, will rock this shaft an additional movement in a clockwise direction.

Fast on the shaft 333 (Figs. 16 and 21) is an arm 360, to the upper end of which is pivoted a link 361, which at its upper end carries a stud 362, projecting through a slot 363, formed in a slotted arm 364, and also through a cam groove 365, formed in the upper end of a lever 366, loosely mounted on a stud 370, supported by the frames 256. The lever 366 is connected to a lever 367, by means of the stud 253, carried by a link 249. The lever 367 carries a roller 368, which projects through a slot formed in the left hand end of the link 252, previously described.

The slotted arm 364 carries a pin 358 which projects into a slot 369 in the total lever disk 106. This slot is so formed that when the total lever is moved to a resetting position the slotted arm 364 is rocked clockwise (Fig. 21), but is not moved on a reading operation. The clockwise movement of slotted arm 364 will rock the lever 367 to a like extent. When the lever 367 is rocked clockwise, the link 252 is rocked counter-clockwise about its pivot, and this disconnects the upper notch 251 from the stud 250, carried by the spider 244.

This disconnecting of the link 252 from the pin 250, carried by the spider 244, takes place before the operation commences. During the first cycle of the normal totalizing operation, the link 252 is moved toward the right, but as it has been disconnected from the spider 244, the spider is not moved at this time, the link moving idly. After it reaches its right hand position, however, the arm 360 fast on shaft 333 is rocked to a farther extent in a clockwise direction, as viewed in Fig. 21, by the cam 310 on the right hand side of the machine, in the manner previously described. This lowers the stud 362 in the cam groove 365 of lever 366, and rocks this lever and the lever 367 still farther in a clockwise direction.

When the link 252 is in its extreme right hand position, and it is rocked counter-clockwise by the farther movement of the levers 366 and 367, a notch 375 therein engages with a stud 376, carried by the spider 244, and when the link 252 is returned to the left, near the end of the first cycle of operation, the spider is rocked in a clockwise direction, in order to engage the selected totalizer line. The selected totalizer is reset to zero during the first part of the second cycle of operation, and then the link 252 is moved toward the right, as viewed in Fig. 21, and as the notch 375 is still in engagement with the pin 376, the movement to the right of the link 252 rocks the spider 244 counter-clockwise to its normal position, thereby disengaging the selected totalizer from the actuators. Near the end of the second cycle of operation, the shaft 333 is rocked counter-clockwise by the cam 310, and through the link 361 and stud 362 acts on the lever 366, and rocks this lever together with the lever 367 in a counter-clockwise direction, thereby disengaging the link 252 from the lower stud 376 on the spider. The link is then moved to the left but is not in engagement with either of the studs 250 or 376. When the total lever is returned to its adding position, the shaft 333 is given a farther counter-clockwise movement, which through the parts just above enumerated, rock the link 252 clockwise to the position shown in Fig. 21, in which the notch 251 engages the stud 250 on spider 244, and the machine is therefore in position for an adding operation.

The movement of the parts in a reading or sub-totalizing operation is different from that in a resetting operation but as the invention herein has nothing to do with a reading operation it is not thought necessary to give any description thereof.

An aligner is provided to prevent the movement of the engaging spider 244 (Fig. 21), unless the total lever is in one of its proper operating positions. Pivoted to the frame 256 is a lever 377, which carries a pin 378, extending into a cam slot 379, formed in the lower end of the lever 367. This lever 377 at its lower end carries a pin 380, which is adapted to cooperate with two notches 381 in the spider 244. It can be seen from Fig. 21 that when the lever 367 is rocked clockwise, the lever 377 is rocked counter-clockwise far enough to engage the pin 380 with one of the notches 381 in the spider. This prevents the movement of the spider until the lever 367 is given its complete clockwise movement, whereupon the cam slot 379 rocks the lever 377 clockwise to the position shown in Fig. 21, thereby permitting the spider to be moved.

*Selection of totalizer line on totalizing operations by the total lever plate*

On normal totalizing and sub-totalizing operations, the selection of the totalizer lines to be operated is made by the total lever disk and not by the three control plates 275, as previously described, in connection with the adding operations. The total lever disk has three cam slots 385 (Fig. 19), formed therein into which projects the pins 274, carried by the arms 272, as previously described. It is the pins 274 which normally cooperate with the selecting plates 275. In totalizing operations it is desired, of course, to have only a single totalizer rocked into engagement during an operation, and therefore the cam slots 385 are so designed that only one of the three lines may be engaged at a time. It will be noted that the cam slot 385 for the front totalizer line is so designed that the front line will be engaged when the total lever is moved to its first position below its adding position.

In the second position below adding position, the back line is selected and in the third position below adding, the upper totalizer line is selected. The same is true when the lever is moved above its adding position. When the total lever is moved to the position corresponding to any particular totalizer line, the appropriate cam slot 385 will act on the appropriate pin 274, to rock the corresponding arm 272 counter-clockwise about its pivot. The arm 272 cooperates with the pin 270, on the link 241, and when the arm 272 is rocked clockwise the link is rocked counter-clockwise so as to engage the pin 242 also carried by the link 241, with the spider 244, in order that when the spider is given its engaging movement, the appropriate totalizer line is engaged.

Selection of reset shaft

Figure 24:
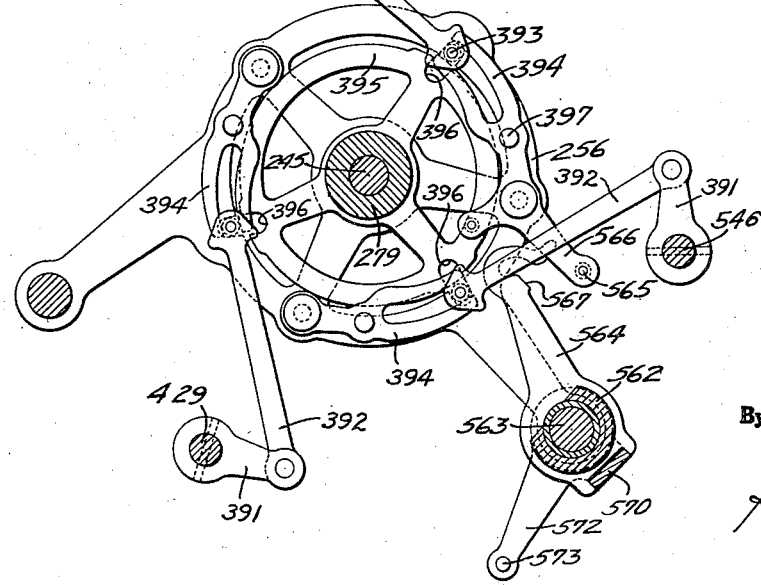
Fig. 24 is a detail side elevation of the mechanism for actuating the reset shaft, used in total-printing operations.

Machines of this type are provided with three shafts 95, 429 and 546 (Figs. 19 and 24), one for each of the totalizer lines. On reading or resetting operations the shaft 95, 429, or 546 which corresponds to the totalizer line selected for engagement, must be rocked in order to actuate certain of the reset mechanism, which is not shown in this application, but which is very well known in machines of this type. The mechanism for normally selecting and rocking these shafts will now be described.

The mechanism appropriate to each of the shafts is identical with that for the other two shafts, and therefore it is thought that the description of one will suffice for all three. Fast on the upper shaft 95 is an arm 391, to which is pivoted a downwardly extending link 392. At its lower end this link carries a pin 393, which projects through the bifurcated end of an arm 394, pivotally supported by the frame 256. Fast on the hub 279, which supports the totalizer engaging spider 244 is a notched disk 395, which has three notches 396 cut therein, one of said notches being opposite each of the pins 393. The notched disk 395 is rocked first clockwise and then counter-clockwise, as viewed in Fig. 24, when the totalizer engaging spider is rocked, as it is on the same hub as this spider, and it can be seen that should the pin 393 on any of the links 392 be moved into engagement with its appropriate notch 396 in disk 395, the link will be moved in the direction of its length when the totalizer engaging spider is rocked, and will thereby through the arm 391 rock the shaft 95 in a counter-clockwise direction. When the spider 244 is returned to its normal position the link 392, arm 391 and shaft 95 will also be returned to their normal positions.

Figure 19:
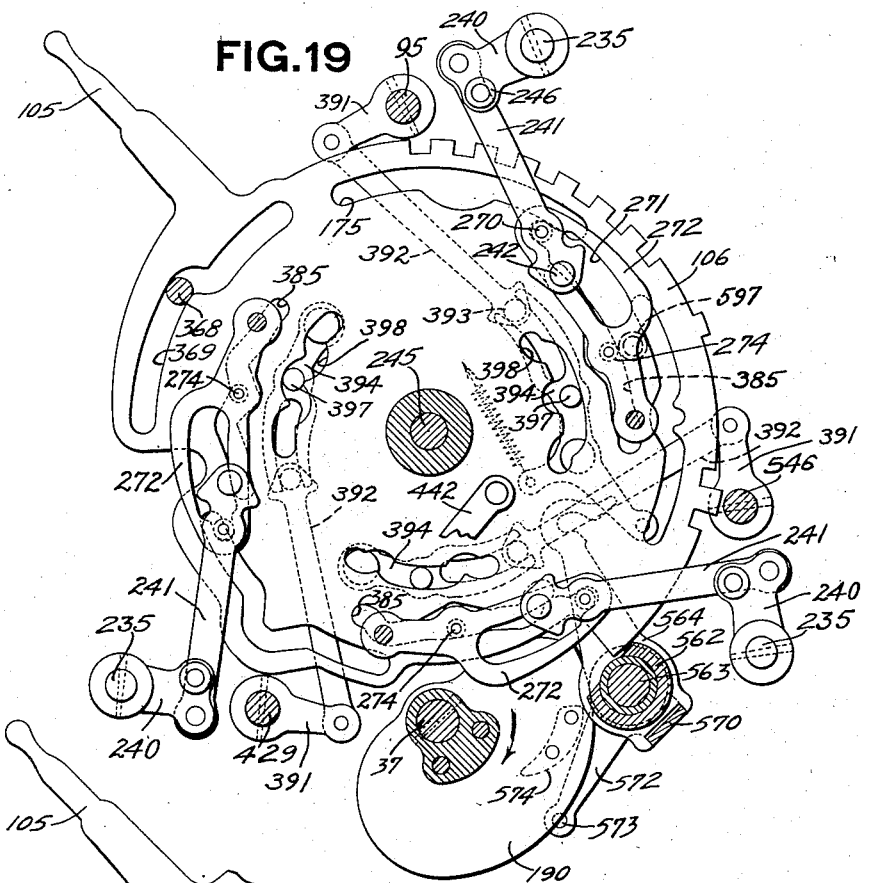
Fig. 19 is a side elevation of the total lever, and part of the mechanism which cooperates therewith.

As the mechanism carried by shafts 95, 429 and 546 is only used on totalizing operations, none of the pins 393 are moved into engagement with their corresponding notches 396 on adding operations. On totalizing operations, however, the total lever disk 106 is used to select which one of the shafts is to be rocked. The shaft selected will, of course, correspond with the totalizer line selected by the total lever disk. This selection is accomplished in the following manner:

Each of the bifurcated arms 394 has a pin 397 projecting from its side, through a corresponding slot 398, cut in the total lever disk. These slots, like the slots 385, which select the totalizer lines, are so designed that only one of the three shafts 95, 429 and 456 will be rocked on any particular operation. The shaft selected depends upon to which position the total lever is moved. The slot 398 cooperating with the mechanism for the upper reset shaft 95, as viewed in Fig. 19 is so designed that it will be effective to select this reset shaft only when the toal lever is moved to its third or lowest position. The front slot selects the reset shaft for the front totalizer line, when the total lever is moved to its first position, and the lower slot selects the reset shaft for the back totalizer line when the total lever is moved to its second position above or below its adding position.

Figure 20:
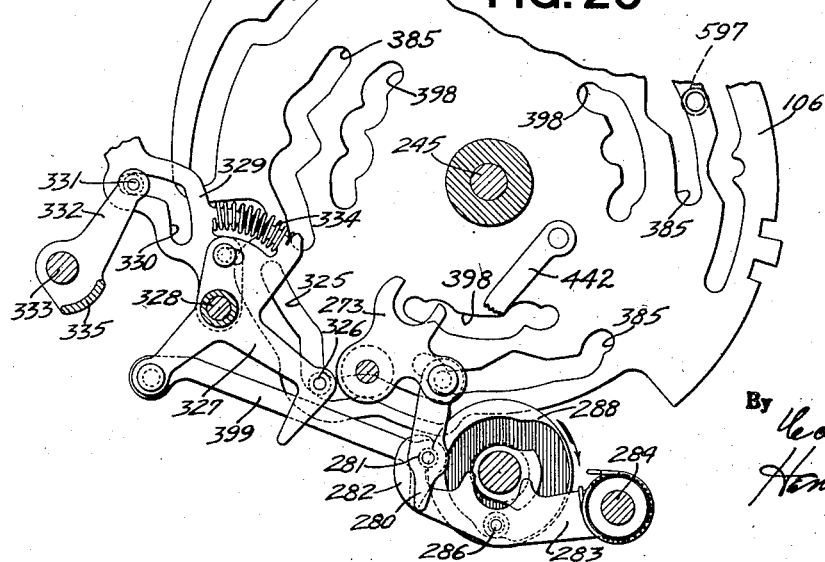
Fig. 20 is a side elevation of the total lever and a part of the mechanism which cooperates therewith.

It will be recalled from an inspection of Fig. 20, that on an adding operation the arm or lever 283 is rocked by the cam 288 to shift the link 280 and the bell crank 273, to rock the three-armed spider 278 for the purpose of moving the pins 274 on the arms 272 into cooperative relation with the totalizer selecting plates 275. On normal totalizing operations the selecting plates are not used, and therefore mechanism is provided for disabling the lever 283 during such operations. It can also be seen from Fig. 20 that the lever 327 is rocked counter-clockwise whenever the total lever is moved out of its adding position, either upward or downward.

Pivoted to a downwardly projecting arm of the lever 327 is a link 399, which is also pivoted on the pin 281, normally connecting the link 280 with the left hand end of the lever 283. Therefore when the total lever is moved out of its adding position, the link will be moved toward the right, and to withdraw the pin 281 from engagement with the notch in the end of the lever 283. With the parts in such positions it is apparent that the lever 283 will be rocked idly by the cam 288, and will have no effect on the totalizer line selecting mechanism.

*Automatic totalizing operations*

It has already been mentioned herein that this machine is so designed that an old balance can be entered on the adding and subtracting or balance totalizer. On the next operation a credit or debit may be added to or subtracted from the old balance. In the present machine the operation will continue without any further adjustment of the manipulative devices, and the balance totalizer will be cleared and reset to zero, and the amount thereon, which is the new balance, will be printed. In this automatic totalizing operation the total lever remains in its adding position and the totalizer to be reset, which is the balance totalizer, will be selected by the three control plates 275, as in adding operations. The machine is given three cycles of operation. The first cycle is the regular adding cycle, in which the new debit or credit is added or subtracted to or from the old balance. The last two cycles are the regular two cycles necessary in a totalizing operation. All three cycles, however, are continuous.

On totalizing operations, a great many devices in the machine are set, or their conditions changed, by the movement of the total lever. In order to accomplish the automatic totalizing operation, it is therefore necessary to provide means for automatically making all the adjustments of the mechanism, which are normally made by hand. This is done by a control shaft, which is given one complete cycle of operation during the three cycles of operation necessary in an automatic resetting operation. The control shaft receives two increments of movement during each of the three cycles of operation. The means for driving the control shaft and controlling the said driving means on an automatic totalizing operation will be described first.

Figure 13:
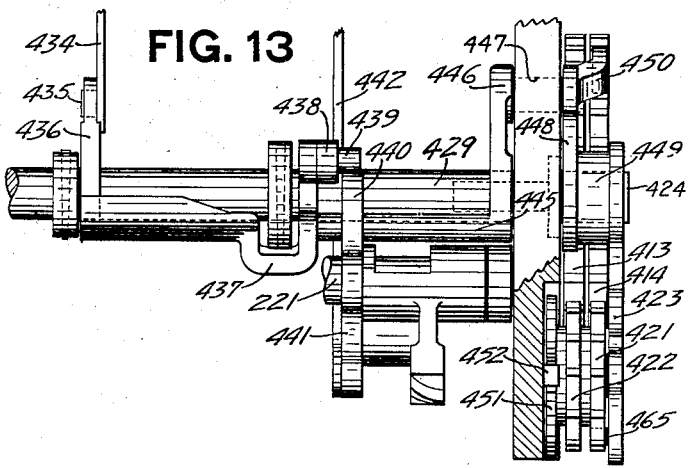
Fig. 13 is a detail elevation of a part of the mechanism for engaging the control shaft drive.

The control shaft and its driving mechanism are best shown in Figs. 11, 12 and 13. A hub 410 is pinned to the right hand end of the main drive shaft 37. This hub carries fast thereon a cam 411, which is for the purpose of enforcing the return to home position of the main drive shaft at the end of the operation of the machine. This cam cooperates with an arm actuated by a heavy spring, neither of these parts being shown in this application, as the device is very old and well known.

Also fast on the hub 410 (Fig. 12) is a gear 413, which receives a complete clockwise rotation on each cycle of operation of the machine. Loosely mounted on the hub 410 is a gear 414, identical with the gear 413. The gear 414 meshes with a similar gear 415, which carries two rollers 416 and 417, projecting from the side thereof. These rollers are adapted to cooperate with a Geneva plate 418 fast on a shaft 419, which is the control shaft, and which is rotatably mounted in the side frame of the machine. The gear 415 carries a locking disk 420, which cooperates with the Geneva plate 418, to prevent movement thereof when either of the pins 416 or 417 is out of engagement therewith. The gear 415 receives a complete counter-clockwise rotation during each cycle of operation of the machine when automatically totalizing, and it is evident that the pin 417 will enter one of the notches in the Geneva plate 418, and partially rotate this plate. This rotation amounts to one-sixth of the complete rotation of the plate, or 60 degrees.

After the pin 417 has passed out of engagement from the notch in the plate 418, which it had previously engaged, the roller 416 will enter the next notch in the plate, and rotate the plate 418 and shaft 419, another 60 degrees in a clockwise direction. The shaft 419 will, therefore, be given 120 degrees, or ⅓ of the complete movement on each cycle of a three cycle operation.

When a three-cycle operation is to be effected, the gear 413 is operatively connected to the gear 414 by two identical pinions 421 and 422, supported by an arm 423, loosely mounted on a stud 424, supported by the right hand side frame of the machine. As these two pinions 421 and 422 are secured together, it is evident that when they are rocked into engagement with the two gears 413 and 414, the driving movement of the gear 413 will be transmitted to the gear 414, and this movement will in turn be given to the gear 415 and Geneva plate 418, for the purpose of driving the control shaft.

Figure 14:
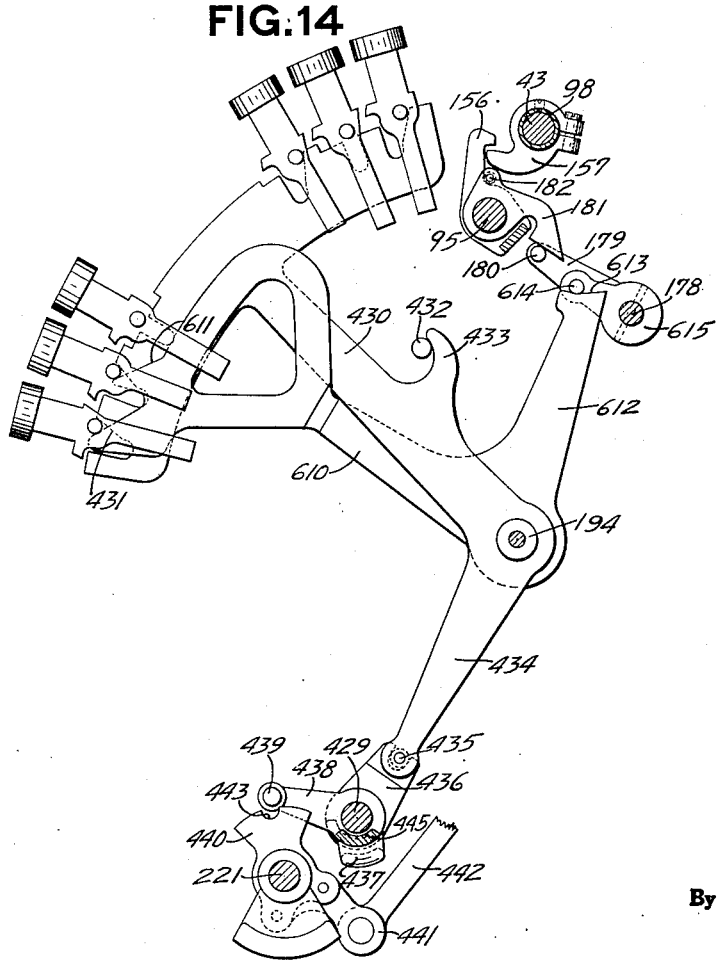
Fig. 14 is a detail view of the three-cycle detent associated with the first control bank to determine when a three-cycle operation is to be performed.

The means for rocking the arm 423 in order to engage the pinions 421 and 422, with the gears 413 and 414 when a three-cycle key is depressed, will now be described. The means for rendering the control shaft 419 operative is controlled by the three cycle keys in the first control bank. This bank is shown in Fig. 14. The first, second, seventh and ninth keys in this bank are three-cycle keys; that is, one of these keys must be depressed on every three-cycle operation.

Cooperating with the pins on these keys is a detent 430 pivotally mounted on the bushing 194. Cooperating with each of the pins on the above enumerated keys, this detent is formed with an inclined surface 431, which if one of these keys is depressed rocks the detent clockwise. The detent is normally prevented from moving counter-clockwise out of its normal position by means of a pin 432, which cooperates with a projection 433 of said detent. The detent 430 has a downwardly extending arm 434, which at its lower end carries a pin 435, projecting into the bifurcated portion of an arm 436, loose on shaft 429 (Figs. 13 and 14). The arm 436 is connected by a yoke 437, with an arm 438, which carries a pin 439, adapted to cooperate with a locking segment 440, loose on the shaft 221, previously described. The locking segment 440 is secured to an arm 441, to which is pivoted the lower end of a link 442, which is in turn pivoted to the total lever disk 106.

The locking segment 440 has a notch 443 cut therein, into which the pin 439 is moved when the detent 430 is rocked clockwise by the depression of one of the three-cycle keys. It is evident that if the total lever disk is moved out of its normal adding position, the locking segment 440 will be rocked either clockwise or counter-clockwise, which will bring the unbroken periphery of said segment 440 beneath the pin 439, and therefore none of the three cycle keys in the first control bank can be depressed. But when the total lever is in the "add" position, the pin 439 moves into the notch 443 and locks the total lever disk 106 in such position.

The yoke 437 has an extension 445, which joins it with an arm 446, loosely mounted on the shaft 429, previously mentioned. The arm 446 carries a pin 447, which projects through an opening in the side frame, and is joined to an arm 448 loose on the stud 424. The arm 448 is connected by a hub 449, to the arm 423 (Fig. 13). It is evident that if the total lever is in its normal position and one of the three-cycle keys is depressed, the detent 430 will be rocked clockwise, as viewed in Fig. 14, which will rock the arm 436 and yoke 437 counter-clockwise, as this yoke is connected by the extension 445 to the arm 446, this arm will be rocked counter-clockwise, as viewed in Fig. 11, and therefore, the arm 423, which supports the gears 421 and 422, will also be rocked counter-clockwise far enough to engage these gears with gears 413 and 414, in order to render the control shaft driving mechanism effective. The idle gear 414 is normally held in its properly aligned position by a tooth 450 carried by the arm 448, which normally extends between two of the teeth of this gear. It is evident that when the arm 448 and the arm 423 are rocked counter-clockwise to engage the pinions 421 and 422, with the gears 413 and 414, the tooth 450 will be removed from engagement with the gear 414, and will thereby permit this gear to be rotated. The pinions 421 and 422 are normally held in their aligned position when they are out of engagement with the gears 414 and 413, by the following mechanism:

Secured to the hub which supports the gears 421 and 422 is a disc 451 (Figs. 11 and 13), which has two oppositely placed notches cut therein, adapted to cooperate with a lug 452 projecting from the machine side frame. It is evident that when the pinions 421 and 422 are moved into engagement with the gears 413 and 414, the disc 451 will be disengaged from the lug 452 and the gears 421 and 422 may therefore be rotated.

There are two of the notches in the disc 451 because the pinions 421 and 422 are so proportioned to the gears 413 and 414 that said pinions 421 and 422 receive 2½ complete rotations to one rotation of the gears 413 and 414, and therefore it is necessary to have one of the aligning notches in each side of the disc 451.

When the pinions 421 and 422 are rocked into engagement with the gears 413 and 414, above described, means is provided for locking said gears in such engagement until near the end of a three-cycle operation to be hereinafter described in detail. This means consists of a lever 460 (Figs. 11 and 15) pivoted at 461, to the machine side frame, and which carries a pin or roller 462, projecting into a cam groove 463 formed on the inside of the gear 413, next to the frame. It can be seen from Fig. 15 that immediately upon the beginning of the rotation of the gear 413, the lever 460 will be rocked clockwise.

At its lower end this lever has a flange 464, which when the lever is rocked as above described, will take a position to the left of a pin 465, as viewed in Fig. 11, carried by the lower end of the arm 423 when a three-cycle key has been depressed before the commencement of the operation of the machine, and the flange 464 will thus hold the pinions 421 and 422 in engagement with the gears 413 and 414 throughout such three-cycle operation. If, however, no three-cycle key has been depressed, the flange 464 will be moved to the right of the pin 465, and thereby prevent the engagement of the pinions 421 and 422 throughout a single-cycle operation of the machine.

*First cycle of a three-cycle operation*

In the first cycle of a three-cycle operation the mechanism is actuated and performs the functions usually performed in a normal adding operation. At the beginning of a three-cycle operation, the release shaft is rocked in a clockwise direction, as is usual, in order to release the machine. As in totalizing operations it is essential that all of the amount keys be brought to their normal undepressed positions before the second cycle of a three-cycle operation takes place, but as it is desirable to have the control keys remain depressed in order to select the proper totalizer for operation, mechanism is provided for disconnecting the release shaft 43 from the sleeve 98, which carries the release mechanism for the control keys, during the first cycle of operation. This mechanism will now be described.

It has already been stated that the arm 117 (Fig. 11) is fast to the shaft 43, which is the release shaft. The link 116 is pivoted to the stud 113 on the arm 117. Fast to the sleeve 98 is an arm 470. The arm 470 carries a coupling pawl 471, which has a notch 472 normally cooperating with a pin 473, carried by the arm 117. It can be seen that the rocking movement of the arm 117 will normally rock the sleeve 98, due to the engagement of the pin 473 with the notch 472 formed in coupling pawl 471, carried by arm 470.

It is apparent that all that is necessary in order to disconnect the shaft 43 from the sleeve 98, is to rock the coupling pawl 471 clockwise, far enough to disengage the notch 472 therein from the pin 473 on arm 117, and this is done in the following manner:

A stud 477 on the upper end of a lever 478 holds the lever 474 in the normal position (shown in Fig. 11), when the shaft 43, arm 117, coupling pawl 471, and arm 470 are rotated upon release of the machine. A cam slot 476 in the coupling pawl 471 is moved to embrace the stud 475 during the releasing movement of the pawl 471. During the first cycle of a three-cycle operation, the lever 478 is rocked clockwise around its pivot 479, to rock the lever 474 counter-clockwise. At this time the slot 476 embraces the stud 475, and therefore, the counter-clockwise movement of the lever 474 rocks the coupling pawl 471 to withdraw the notch 472 from the stud 473 on the arm 117. Subsequent rocking movement of the arm 117 and shaft 43, by link 116, to release the amount keys at the end of the first cycle of a three-cycle operation has no effect on the arm 470 and sleeve 98, and therefore, the releasing mechanism for the control keys remains inactive, and the control keys remain depressed to select totalizers during the second and third cycles of operation.

A stud 469 (Figs. 6 and 11B) on the right side frame of the machine, normally maintains the notch 472 of the coupling pawl 471 in contact with the stud 473 of the arm 117. The lower wall of the coupling pawl 471 is concentric with the center of the release shaft 43, and therefore, when the pawl 471 rocks clockwise upon release of the machine, the stud 469, contacting the concentric edge of the pawl 471, maintains the connection between the notch 472 and stud 473 effective. However, at the end of such releasing movement the tail 468 of the pawl 471 escapes the stud 469 to subsequently permit the uncoupling movement of the coupling pawl by the levers 474 and 478 and stud 475. The pawl is so formed that after it is uncoupled the tail 468 thereof moves over the stud 469 to hold the pawl 471, arm 470 and sleeve 98 in their moved positions, when the shaft 43 moves to release the amount keys.

The mechanism on the control shaft to operate the lever 478 for effecting the disconnection of the sleeve 98 from the shaft 43 will now be described. As shown in Fig. 11, the control shaft 419, carries a pair of cams 480, which cooperate with a pair of rollers 481 and 482, carried by the lower end of a lever 483, supported by the machine frame. This mechanism is shown in Figs. 11 and 15. At its upper end the lever 483 is pivoted to a link 484, which at its left hand end is pivoted to an arm 485, loose on a stud 486 projecting from the machine frame. The link 484 carries a roller 487, which extends into a cam slot 488, formed in the lower end of the lever 478. It can be seen from the time chart that during its first one-third movement, which corresponds to the first cycle of operation, the cams 480 rock the lever 483 counter-clockwise. This will cause the roller 487 to move toward the left, and due to the shape of the cam slot 488, the lever 478 is rocked clockwise, and this in turn rocks the lever 474 counter-clockwise, as above described, to rock the coupling pawl 471 to effect the disengagement of the sleeve 98 from the shaft 43.

When the release shaft 43 is rocked counter-clockwise (Figs. 1 and 11), at the end of the first cycle of operation of the machine, to move the rod 68 into contact with the link 65 to release the depressed amount keys, the sleeve 98 (Fig. 7), will not rock therewith, because the sleeve is disconnected from the shaft. Therefore, the arm 119 and the stud 118 thereon, remain in their operated positions to maintain the pawls 120 and 121 in their machine releasing positions. After the shaft 43 has effected the release of the amount keys, it immediately returns to its machine releasing position, since the pawls 120 and 121 are held in released positions by the arm 119 and stud 118. Thus the machine continues to operate without interruption after the first cycle of operation.

*Mechanism for stopping the operation of the machine if the amount keys fail to release at proper time*

If by accident, or improper operation of the release mechanism, the amount keys should fail to release, an automatic means interrupts the operation of the machine at the end of the first cycle of operation.

Figure 9:
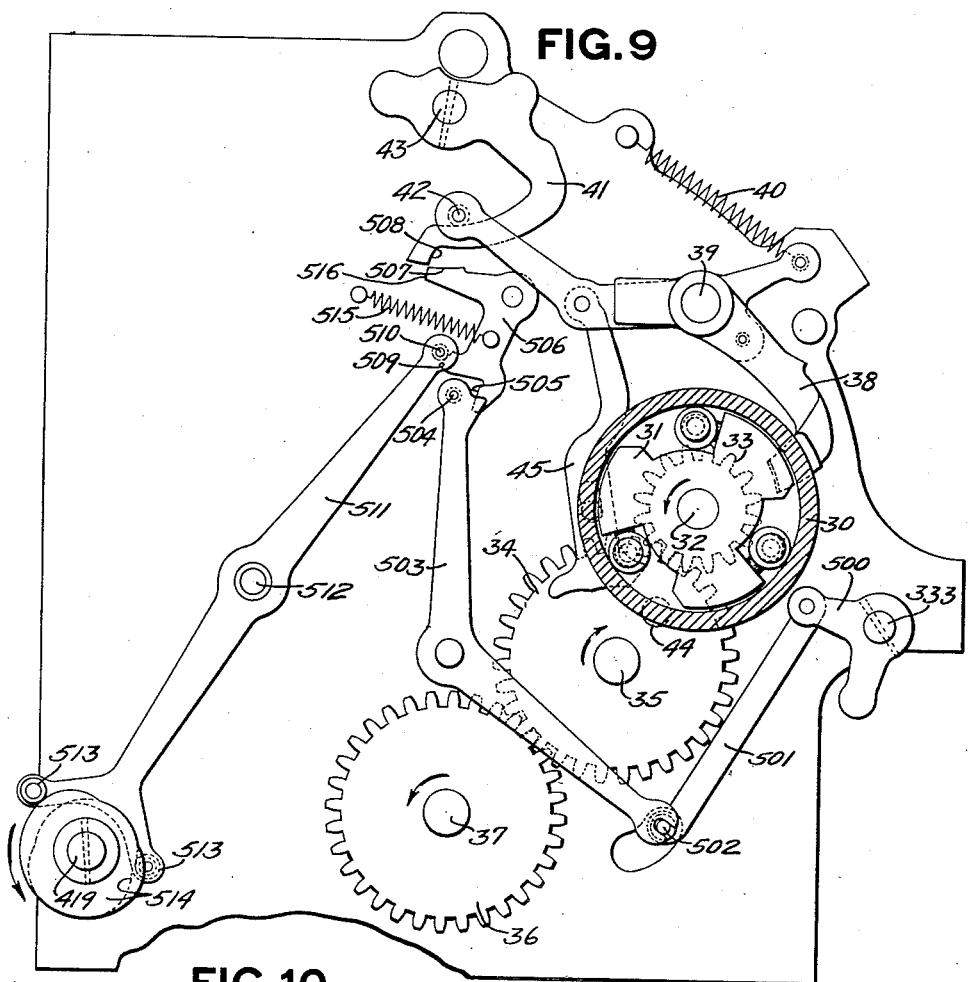
Fig. 9 is a left hand side elevation of the machine.

The mechanism for stopping the operation of the machine, should the amount keys fail to release is shown in Figs. 1 and 9. At the extreme end of the first cycle of a three-cycle operation, the shaft 333 is rocked in a clockwise direction (Figs. 11 and 15) by a torsion spring 520 (see also Fig. 16) which will be hereinafter described. This movement of the shaft 333, as viewed in Fig. 9 is counter-clockwise. On its extreme left hand end the shaft 333 carries an arm 500, to which is pivoted the upper end of a link 501 having at its lower end a pin 502, cooperating with the bifurcated end of a lever 503, pivoted to the machine side frame..

At its upper end the lever 503 carries a pin 504, which is adapted to cooperate with a surface 505 on a bell crank lever 506, pivoted to the machine side frame. The bell crank lever 506 has a face 507 to cooperate with a downwardly extending foot 508, on the hooked arm 41, previously described.

Cooperating with a surface 509, of the bell crank 506, is a pin 510, carried by the upper end of a lever 511, pivoted at 512 to the machine frame. At its lower end the lever 511 carries two rollers 513, which cooperate with a pair of cams 514, fast on the left hand end of the control shaft 419. During the first cycle of a three-cycle operation, the cams 514 rock the lever 511 counter-clockwise (Fig. 9). It is apparent that with the lever 503 in normal position, the bell crank lever 506 can be rocked clockwise until the surface 505 strikes the pin 504. When the lever 511 is rocked by the control shaft, the movement of the bell crank lever 506 is effected by means of a spring 515, stretched between a pin on the lever 506 and a pin on the frame. If the bell crank lever 506 is permitted to rock clockwise, the face 507 thereof moves upwardly into the path of the foot 508 of hooked arm 41, and therefore, when the shaft 43 commences its releasing movement at the beginning of the second cycle of operation, the foot will strike the end 516 of the bell crank, and the release of the machine will be prevented.

This will occur, however, only when an amount key fails to release because when the shaft 333 is rocked counter-clockwise by its spring 520 at the end of the first cycle, the link 501 will be moved downwardly and the lever 503 will be rocked clockwise a sufficient distance to bring the pin 504 against the surface 505. It is evident that this will prevent the clockwise movement of the bell crank lever 506 to the position in which it prevents the release of the machine. It will be remembered that when an amount key is depressed, the hooked end 79 of the detent arm 66 is rocked clockwise as viewed in Fig. 1, in order to rock the zero stop pawl 75 to its ineffective position.

This clockwise movement of the detent arm 66 brings the lower end 79 thereof, beneath the rod 349 supported by the arm 348, fast on the shaft 333. It is evident, therefore, that if any of the amount keys in a bank should fail to release and return to their normal undepressed positions, the lower end 79 of the arm 66 will be beneath the rod 349, to arrest the spring actuated shaft 333.

If the shaft 333 is arrested the lever 503 will be held in the position shown in Figure 9, and the bell crank lever 506 will be permitted to rock clockwise to a position in which it will obstruct the hooked arm 41 when the lever 511 is rocked by the cam 514 on the release shaft at the end of the first cycle of a three-cycle operation.

If the amount keys are all released and return to their undepressed positions, the end 79 of the arm 66 is moved out of the path of the rod 349, and the shaft 333 can then move under action of the spring 520 to adjust the parts as above described, to hold the bell crank lever 506 in the position shown in Fig. 9, in which it will not interfere with the release of the machine at the end of the first cycle.

*Movement of zero throwout shaft during first cycle*

The shaft 333 (Figs. 11 and 15) is rocked clockwise just at the end of the first cycle. This clockwise movement of the throwout shaft corresponds to the movement normally given the shaft by the movement of the total lever when moved out of its adding position. During a three-cycle operation, however, this movement is given to the shaft 333 automatically, and in a manner which will now be described.

A torsion spring 520 (Figs. 15 and 16) encircles the shaft 333, and tends to rock the shaft clockwise. This movement is normally prevented, however, by the engagement of the pawl 346 pivotally supported on the pin 351 by the arm 347, fast on the shaft 333, as previously described. Means is provided for disengaging the pawl 346 from the notch 345 in notched segment 337 during the first cycle of operation. This mechanism consists of an arm 521 loose on the stud 486. Secured to the hub of the arm 521 is the arm 485, to which is pivoted the link 484. The arm 521 carries a roller 522, which is adapted to cooperate with a projection 523 of the pawl 346. Near the end of the first cycle of a three-cycle operation, the lever 483 is rocked counter-clockwise, thereby moving the link 484 to the left, as viewed in Fig. 15.

The movement of the link 484 to the left will rock the arm 521 counter-clockwise, and move the roller 522 into engagement with the projection 523, thereby rocking the pawl 346 a sufficient distance to disengage the pawl from the notch 345 in segment 337. The arm 347 and the shaft 333 will then attempt to rock clockwise under the influence of the spring 520, but this movement is prevented by the engagement of an upwardly extending arm 524, of a bell crank lever 525, also pivoted on the stud 486, which at the beginning of the operation has been rocked clockwise into the path of the pivot pin 351 of the pawl 346.

The shaft 333 is given its initial movement before the start of a normal total taking operation. On a three-cycle operation the shaft 333 must be moved slightly clockwise before the second cycle of operation. The shaft, however, cannot move until the amount keys have been released, and, as this occurs very near the end of the first cycle, the movement of the shaft 333 must be rapid. For this reason a snap movement is provided. This is controlled by the arm 524 which at the beginning of the first cycle is rocked clockwise to a position in the path of the pin 351 which forms a pivot for the pawl 346. It will be recalled that the lever 460 is rocked clockwise at the beginning of the operation of the machine. The movement is transmitted to the pitman 526 by means of a spring 324 stretched between a stud on this pitman and a stud on the lever 460. As the pitman 526 moves to the right the arm 525 follows urged by the spring 324. This moves the bell crank 525 clockwise until the arm 524 thereon is in the path of the pivot pin 351 of the pawl 346. The arm 347 is thereby held in its normal position until very near the end of the first cycle, when the lever 460 is given its counter-clockwise movement by the cam 463, which will restore the arm 524 to its normal position. As the arm 524 arrives at its normal position, as shown in Fig. 15, the tip thereon will pass from under the pivot pin in the pawl 346 and the spring 520 will rock the arm 347 and the shaft 333 rapidly clockwise.

As described above, the first counter-clockwise movement of the lever 483 will rock the arm 521 and the roller 522 thereon a sufficient distance to withdraw the nose of the pawl 346 from notch in the arm 337. The roller 522 is then in a position underneath the pawl 346. As this pawl, the arm 347 and shaft 333 are rocked clockwise, as just described, the movement will be limited by the surface 499 on the pawl 346, contacting with the roller 522.

The second counter-clockwise movement of the lever 483 gives the arm 521 and roller 522 a further counter-clockwise movement during which the roller 522 enters a recess 529 in the pawl 346 formed by a projection 523 thereon, and rocks the pawl 346, arm 347 and shaft 333 clockwise. This occurs near the end of the second cycle of operation. It is the second movement of the shaft 333 which moves the zero stop pawls 75 to their ineffective position. On the second and third cycles of operation the pivot pin 351 of the pawl 346 is in the path of the arm 524 and prevents this arm and the arm 525 from rocking clockwise, which prevents the link 526 moving to the right with the lever 460. As the lever 460 is given a regular excursion on each cycle of operation, a slot 528 is formed therein which will move idly over the pin 527 and merely stretch the spring 324 when the link 526 is held against movement.

It is necessary to prevent the clockwise movement of the shaft 333 until the very end of the first cycle of operation, as until the amount keys are released at the end of the first cycle, the movement of the shaft 333 will be obstructed by the tails 79 of the hooked arms 66.

The necessity for disengaging the pawl 346 from the arm 337, will be understood, when it is noted that the arm 337, link 338, lever 339, and the link 308, are not moved in three-cycle operations, as they are in normal total-izing operations. For this reason it is essential that they remain in their normal position. The reset shaft 333, however, must be rocked, in order to rock out the zero stop pawls in the amount banks, and also to control the totalizer engaging mechanism in a manner which has already been described.

SECOND CYCLE OF OPERATION

*Mechanism for preventing restoration of release shaft at the end of the second cycle of operation*

This mechanism is shown in Figs. 11 and 18. In order to prevent the restoration of the release shaft at the end of the second cycle of operation when the arm 301 moves downwardly, the coupling lever 304 is rocked counter-clockwise a sufficient distance to remove the shoulder thereon from beneath the pin 302 on the arm 301. When this has been accomplished, it is evident that the pin 302 will move downwardly in the opening 312, until it strikes the surface 530 formed in said opening. The link 116 will therefore be moved down slightly, but as the shaft 43 is at this time disconnected from the sleeve 98, the release mechanism will not be restored, and therefore when the arm 301 returns to its normal upper position, the link 116 will also return to its operative position.

The mechanism for rocking the coupling link 304 counter-clockwise, to remove the shoulder 303 thereof, from beneath the pin 302 will now be described. Pivoted to the lever 483 (Fig. 18) is a link 531, which at its left hand end is pivoted to an arm 532, supported by a stud 533, projecting from the machine side frame. The arm 532 is connected by a yoke 534 to a striker arm 535, which carries two pins 536 and 537, projecting laterally therefrom. In the normal position of the parts, as shown in Fig. 18, the pin 536 is in contact with the lower end of the coupling lever 304. During the first cycle of operation the lever 483 is rocked in a counter-clockwise direction. This moves the pin 536 away from the lower end of the coupling lever 304.

The movement of the pin 536 away from the coupling lever 304, brings the pin 537 into contact therewith, but does not move this lever. During the second cycle of operation, the lever 483 is rocked farther in a counter-clockwise direction, and as the pin 537 is now in contact with the coupling lever 304, the continued movement of the striker arm 535 rocks the coupling lever 304 counter-clockwise a sufficient distance to remove the shoulder 303 thereon, from beneath the pin 302, as previously described.

This movement of the coupling lever 304 is against the tension of the spring 538, which normally tends to rock the lever in a clockwise direction. The lever is guided in its movement by means of a stud 539, projecting from the link 116, which extends through a slot 540 in said lever.

The cams 480 are so shaped that on the third cycle of operation when the shaft 419 receives its last movement the parts will be restored to their normal position as shown in Fig. 11.

*Totalizer selecting mechanism*

During the second cycle of operation the control plates 275 are adjusted by the control bank differential mechanism. The control plates are so designed that on a three-cycle operation they will always select the upper totalizer line, which carries the balance totalizer, for operation.

*Mechanism for automatically controlling the totalizer engaging devices*

It can be seen from Fig. 21, and it will be recalled that cams 258 on the main drive shaft, together with the Y shaped levers 254 and the totalizer engaging link 252, are used for the purpose of rocking the spider 244 first clockwise and then counter-clockwise to engage and disengage the selected totalizer line. As above noted, in this three-cycle operation, the upper totalizer line is always engaged under control of the three selecting plates 275. This will cause the pin 242 for the upper line to be moved into the hook 243 on the spider 244.

In an automatic resetting operation the slotted arm 364 (Fig. 21) remains stationary, due to the fact that its pin 358 extends through the slot 369 in the total lever, and the total lever is not moved in this operation. On the first cycle of operation the arm 360 and shaft 333 are rocked clockwise, as above described, and this movement through the link 361 will move the stud 362 downward in the straight portion of the slots 363 and 365. This movement will have no effect on the lever 366.

Mechanism, which will now be described, is actuated to disengage the upper notch 251 from the stud 250. This mechanism (Figs. 17 and 21) includes a stud 253, carried by the link 249, previously described. At its right hand end the link 249 is pivoted to an arm 545, loosely mounted on a shaft 546, supported by the side frame of the machine. The arm 545 is connected by means of a hub 547, to a bell crank lever 548, which has pivoted to its rearwardly extended arm, the upper end of a pitman 549, which at its lower end encircles the control shaft 419. This pitman carries two rollers 550 and 551, which cooperate with a pair of cams 552 fast on the control shaft 419.

The cams 552 (Fig. 21) are so designed that, on the first movement of the control shaft 419 on the second cycle of operation, the pitman 549 is given an upward movement, which rocks the bell crank lever 548 counter-clockwise. The arm 545, which is connected thereto, will also be rocked counter-clockwise, thereby tensioning the torsion spring 553 which surrounds the shaft 546 and bears against the arm 545. The counter-clockwise movement of the arm 545 will move the link 249 to the left and, as the lever 366 is held stationary due to the fact that the pin 358 extends through the slot 369 in the total lever disk 106, the stud 253 will act in two cam slots 554 and 555 in the levers 366 and 367 respectively, to give the lever 367 a clockwise movement. This clockwise movement of the lever 367 will, by means of the stud 368 therein, move the totalizer engaging link 252 down and disengage the notch 251 from the stud 250 on the spider 244.

The cams 258 (Fig. 21) will then move the pitman 252 toward the right. After the pitman has reached its right hand position, the shaft 333 is given an additional clockwise movement by the cam 480 (Figs. 11 and 15) which will bring the stud 262 into the lower end of the slots 363 and 365. As the slot 365 is curved, the levers 366 and 367 will be rocked in a clockwise direction about the stud 370. This additional movement given the lever 367 will through the stud 368 rock the counter engaging pitman 252 down to engage the lower notch 375 therein with the pin 376 on the spider 244.

The cam 258 then moves the link 252 to the left, and as the link 252 is now connected to the spider, the spider will be rocked clockwise, thereby engaging the upper or balance totalizer arm. During the latter half of the second cycle of operation the pitman 549 is given an additional upward movement, and this will give the link 249 an additional movement toward the left, but this movement will be idle, inasmuch as the extreme left hand end of the slots 554 and 555 are straight.

During the third cycle of operation the link 361 is moved upwardly to its normal position, thereby rocking the lever 366 counter-clockwise to its normal position. The lever 367 will also be rocked counter-clockwise, which movement through the pin 368, will disengage the link 252 from the pin 376. It will be remembered that the link 252 receives an excursion to the right and return on each cycle of operation by the cams 258 and the arm 254. It is while the link is in its right hand position, during the third cycle, that it is disengaged from the pin 376. At this time the shaft 419 receives its final movement, which through the cams 552, partly restores the pitman 549. This movement positions the stud 253 to the right hand end of the parallel portions of the cam slots 554 and 555. As the pitman 549 is moved down, the arm 545 will rock clockwise, moving the link 249 and stud 253 to the right. Due to the shape of the slots 554 and 555 this movement urges the link 252 upward, but as the link is in its right hand position an edge 259 thereon, which at this time is directly underneath the pin 250, is brought into contact therewith, and thereby temporarily limits the movement of the stud 253 and link 249 to the right, and the downward movement of the pitman 549. However, since the cams 552 continue their clockwise movement to the home position, without interruption, it is necessary to provide a recess in the cam which engages the roller 551, to accommodate this roller when the downward movement of the pitman 549 is limited by the edge 259 contacting the pin 250. It will be recalled that the spring 553 constantly urges the arm 545 and consequently the link 249 and pitman 549 toward their normal position. This spring at this time holds the edge 259 of the link 252 in contact with the pin 250. Near the end of the third cycle of operation the cams 257 move the link 252 toward the left. As the notch 251 arrives opposite the pin 250, the spring 553 will move the link 249 to the right, which through the stud 253 will cam the lever 367 counter-clockwise which in turn will rock the link 252 into engagement with the pin 250. This occurs at the very end of the operation.

*Automatic selection of upper reset shaft*

It will be remembered that there are three shafts 95, 429 and 546 (Fig. 24), which are selected on totalizing operations in accordance with the totalizer line to be operated, the shaft appropriate to the selected line being rocked by the notched disk 395. The shaft is selected by rocking the forked arm 394 counter-clockwise, in order to move the pin 393, carried by the link 392, into the notch 396 in the disk 395. In normal totalizing operations this selection and movement of the links 392 is effected by the movement of the total lever. In three-cycle operations, however, the total lever is not moved, and therefore, automatic means is provided to select the upper reset line 95 for operation, as this line is the one which corresponds to the upper or balance totalizer line.

It will be remembered that the bell crank 548 (Fig. 21) is operated by the pitman 549 and the cams 552 on the control shaft 419. During the second cycle of operation, the pitman 549 is moved upwardly, thereby rocking the bell crank lever 548 counter-clockwise. Connected to the downwardly extending arm of this lever is a link 560, which at its left hand end is pivoted to the upper end of an arm 561, fast on a hub 562 (Fig. 24), surrounding a shaft 563. Also secured to this hub 562 is a hook arm 564. The hook arm 564 is adapted to cooperate with the pin 565 carried by a downwardly extending leg 566 of the forked arm 394, for the upper reset line.

It will be recalled that the cams 552 give the pitman 549 and bell crank 548, two distinct counter-clockwise movements during the second cycle of rotation. The first of these movements will through the link 560 and arm 561, rock the arm, and through hub 562 rock the hook arm 564 clockwise far enough to bring a surface 567 on said hook arm, into contact with the pin 565. The second movement of the pitman 549 rocks the hook arm 564 farther in a clockwise direction, thereby bringing the hook of the arm into engagement with the pin 565 and rocking the forked arm 394 in a counter-clockwise direction a sufficient distance to move the pin 393 into engagement with the notch 396 appropriate thereto, in the notched disk 395. Then when the spider 244 is rocked clockwise to engage the selected totalizer line which in this case is the upper line, the disk 395 will be rocked also in a clockwise direction, and through the link 392 and arm 391, will rock the upper reset shaft 95 in a counter-clockwise direction.

It has been previously mentioned that the cam 552, which cooperates with the lower roller 551 on the pitman 549, is recessed to accommodate the roller 551 when the pitman is arrested by the surface 259 striking the pin 250, before the cams 552 complete their rotation. After the cams have completed their rotation, the pitman is brought toward its home position, and the spring 553 bearing against the arm 545 moves the pitman 549 downward to its normal position. Means is provided for positively effecting the return of the pitman 549 and the parts driven therefrom, to their normal positions, should the spring 553 fail to operate.

Loosely mounted on the shaft 563 is a yoke 570 (Figs. 4, 17, 19 and 21) supported at its left hand end, as shown in Fig. 17, by an arm 571, and at its right hand end by an arm 572. The arm 564 is bifurcated at its lower end, and embraces the yoke 570. The arm 572 carries a pin 573, which extends laterally therefrom, and is adapted to cooperate with a cam plate 574, secured to one of a pair of cams 190, which drive the differential mechanism for the first control bank.

On the first cycle of a three-cycle operation, the arm 572 does not move, as the pitman 549 (Fig. 21) is held stationary during this cycle. During the second cycle of operation, however, the arm 572 is rocked clockwise far enough to bring the pin 573 into position to cooperate with the cam 574. The cam 190 has, however, started to operate before this movement of the arm 572, so that the cam plate 574 has already passed the pin 573. During the second movement of the arm 572, which occurs in the second cycle of operation, the arm 572 is rocked farther in a clockwise direction, and in this position the pin 573 will be above the cam plate 574.

On the third cycle of operation the cam 552 through the pitman 549 and the above described connections, will positively rock the arm 572 counter-clockwise to a position in which the pin 573 is once more in the path of the cam plate 574. At this point in the operation, the spring 553 becomes effective and this spring will normally move the arm 573 the rest of the way in a clockwise direction to its normal position. But should the spring break, or anything occur which would prevent the operation of the spring, the cam plate 574 will at the beginning of the subsequent operation, come into contact with the pin 573, and rock the arm 572 counter-clockwise to its home position thereby restoring the bell crank lever 548 and pitman 549 to their home positions.

Third Cycle

*Restoration of release shaft*

Near the end of the third cycle of operation, it is necessary to again connect the sleeve 98, which carries the release mechanism for the control keys, with the release shaft 43, in order that the depressed control keys may be released. This is accomplished in the following manner:

The cams 480 (Fig. 11), will, during the third cycle of operation, rock the lever 483 clockwise to its normal position. This will cause the pin 487 (Fig. 15), carried by the link 484, to move to the right hand end of the slot 488, in lever 478. This movement will rock the lever 478 (Fig. 11), in a counter-clockwise direction, and due to the engagement of the pin 477 with the lower end of the lever 474, this lever will be rocked clockwise, thereby disengaging the pin 475 from the notch 476 in the coupling pawl 471, and reengaging this coupling pawl 471 with the pin 473, carried by arm 117.

The clockwise movement of the lever 483 (Fig. 11) will through the link 531 rock the striker arm 535 to its normal position, thereby permitting the coupling lever 304 to rock clockwise under the influence of the spring 538, to bring the shoulder 303 of this arm beneath the pin 302, carried by the arm 301. It can be seen, therefore, that at the end of the third cycle, when the arm 301 is rocked clockwise, the pin 302 will engage the shoulder 303 of the coupling lever 304, and will move the link 116 downwardly, slightly past its normal position, and then back to its normal position. As the sleeve 98 is at this time operatively connected with the shaft 43, it is evident that the sleeve 98 will also be rocked, and that the control keys will be released in the manner already described, in connection with the description of these keys.

When the sleeve 98 and shaft 43 are rocked slightly beyond their normal position, as above noted, the pawls 120 and 121 will take a position behind the half-round stud 118, carried by the lever 119, fast on the sleeve 98, and this sleeve and the shaft 43 will, therefore, be held in their normal positions, until the machine is once more released.

The movement of the link 484 to the right, will through the arm 485, rock the arm 521 clockwise to its normal position near the end of the third cycle of operation. The movement of the arm 521 in a clockwise direction will rock the shaft 333 counter-clockwise to its normal position. This movement is accomplished through the cooperation of the pin 522, carried by the arm 521, with the lower side of the pawl 346. As the shaft 333 rocks counter-clockwise, and reaches its normal position, the nose of the pawl 346 will move into engagement with the notch 345 in the arm 337, and will thereby connect the arm to the shaft 333, as shown in Fig. 15. This adjustment of the parts will leave the machine in condition for either another three-cycle operation, or an ordinary adding, or a totalizing operation.

*Control of differential mechanism in second and third control banks in three-cycle operations*

In three-cycle operations, the differential mechanism for the second and third control banks must be free to operate under control of the keys depressed in these banks during the first cycle. This machine is so constructed, however, that on the second and third cycles, of a three-cycle operation, it is necessary that the differential mechanism for the second and third control banks be arrested in their zero positions, as the upper or adding and subtracting totalizer is the only one to be engaged on these cycles.

Figure 3:
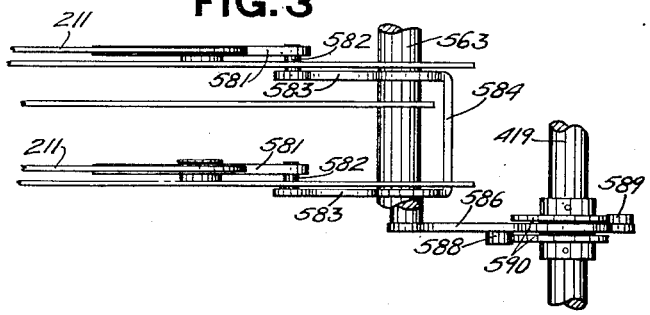
Fig. 3 is a top view of the mechanism by which the latches in the second and third control banks are disconnected from their drivers during their zero positions in three cycle operations.

Mechanism for accomplishing this function is shown in Fig. 2, and will now be described. The bell cranks 211, for the second and third control banks, have downwardly extending arms 580 adapted to cooperate with hook levers 581, pivoted to the differential supporting frames for these banks. Each of the levers 581 is bifurcated at its rear end, and cooperates with a pin 582, carried by the forward end of an arm 583, loose on shaft 563. As shown in Fig. 3, the arms 583 are joined by a yoke 584. The arm 583, appropriate to the second control bank, has a downwardly extending leg 585, to which is pivoted the forward end of a pitman 586, which has a slot 587 formed in its rear end, surrounding the control shaft 419.

The pitman 586 carries two rollers 588 and 589, which cooperate with a pair of cams 590, fast on the control shaft. It can be seen that these cams are so designed that at the end of the first cycle of operation the pitman 586 is moved toward the right, as viewed in Fig. 2. This movement will rock the arms 583 counter-clockwise, and the hook levers 581 clockwise a sufficient distance to bring the hook ends of the levers 581 into the path of the arm 580. With the parts in this position it is evident that when the differential mechanisms commence their second cycle of operation, the arms 580 will strike the hook levers 581, and through the slot and pin connections, well known in these machines, disconnect the differential latch in the zero position.

The cams 590 will hold the pitman 586 in its moved position until near the end of the third cycle of operation, when the parts will be restored to their normal position, leaving the second and third bank differential mechanisms free to operate under the control of the keys depressed in their respective banks.

*Automatic latch breaking mechanism for first control bank*

The differential mechanism of the first control bank is used for selecting the columns in which the amounts of the transactions will print. There are three of these columns, the debit column, the credit column and the balance column. If the overdraft minus key, which is the lowermost key in this bank, is depressed, the zero stop pawl 75 will not be rocked to its ineffective position, as the detent 150 (Fig. 4) is cut away opposite the overdraft minus key, so that this key will have no effect on said detent. On the first cycle of operation, therefore, the latch is disconnected from its driver by the zero stop pawl, which in a manner to be hereinafter described, selects the credit column. On the second and third cycles the latch will be disconnected by the key as the zero stop pawl is automatically rocked to its ineffective position. The position in which the differential mechanism is stopped by this key is located to select the balance column on the record strip and the card. The mechanism for rocking out the zero stop pawl on the second and third cycles of operation is shown in Fig. 4. It will be remembered that the shaft 333 is rocked clockwise, just at the end of the first cycle of operation. This shaft carries an arm 604 fast thereon, which cooperates with a pin 605, carried by an arm 606, which is integral with the zero stop pawl 75. When the shaft 333 is rocked clockwise at the end of the first cycle of operation, the arm 604 will contact with the pin 605, and rock the arm 606 and bell crank lever 75 counter-clockwise to the ineffective position of this lever. This position will be maintained throughout the second and third cycles of operation, and the bell crank lever will be returned to its normal position near the end of the third cycle of operation, when the shaft 333 is rocked counter-clockwise to its normal position.

It will be noticed that the second key in this bank, known as the "subtract balance" key, is a short key; that is, the inner end of this key has been cut off, so that even when the key is depressed, the differential latch mechanism will not come in contact therewith. This key is a three-cycle key and during the first cycle the differential latch mechanism is disconnected by the zero stop pawl, as this key, like the overdraft minus key just described, does not cooperate with the detent 150 to rock out the zero stop pawl.

On the second and third cycles of operation, however, the zero stop pawl will be rocked out, as above described, and the differential latch mechanism will be permitted to pass by the zero stop pawl and the subtract balance key. It will move up to the seventh position, where it will be broken by the following mechanism.

The differentially movable arm 577 for this bank has two wings 578 and 579 formed thereon, which are adapted to cooperate with a latch-controlling spider 591, loosely mounted on the shaft 546. Fast on the control shaft 419 is a cam 592 adapted to cooperate with a roller 593, carried by a downwardly extending arm 594, of the latch spider 591. The cam 592 is so designed that it will have no effect on the latch-controlling spider during the first cycle of a three-cycle operation. During the second cycle, however, the cam will come in contact with the roller 593, and will rock the spider 591 clockwise a sufficient distance to bring a nose 595 thereon into the path of a shoulder 596, cut in the wing 579 of the differentially movable arm 577. When the notch 596 strikes the nose 595, the differentially movable arm 577 will be stopped, and through the usual slot and pin connection, the bell crank lever 203 of the differential latch arm will be rocked counter-clockwise, in order to disconnect the latch in the seventh position. This position of the differential mechanism selects the balance column.

The third key from the bottom in the first control bank, is the "old balance minus" key. This key is a long key, and controls the machine in an operation in which the old balance is entered on the subtracting side of the adding and subtracting totalizer. This operation is for one cycle only, and the old balance minus key will disconnect the latch in this position. This position will also select the balance column, as it is in this column that the old balance must be printed.

The fourth key from the bottom in the first control bank is the add-balance key. This, like the subtract-balance key, is a short key, and will not disconnect the latch of the differential mechanism on this key. This key, however, cooperates with the detent 150, which when the key is depressed will rock out the zero stop pawl 75. The differential mechanism is therefore permitted to move up, and on the first cycle of operation, the differential mechanism is arrested in the ninth position, there being a lug on the frame which cooperates with the bell crank lever 203 to effect this purpose. The ninth position of the control bank selects the debit column. In the second cycle of operation the differential latch is arrested by the member 591, The nose 595 of which has been moved into the path of the shoulder 596 by the cam 592, and therefore, the balance column will be selected on the second and third cycles of this operation.

The fifth key from the bottom is the old balance plus key. This key controls the machine only for a one-cycle operation, and is for the purpose of entering a positive old balance on the adding and subtracting totalizer. The balance column will be selected when the differential latch mechanism is arrested in the old balance plus position.

The uppermost key in the first control bank is the overdraft plus key. This key is in the ninth position, and is a three-cycle key. On the first cycle the differential latch is arrested by the key, and as it is in the ninth position, the debit column is selected. On the second and third cycles, however, the automatic latch arresting mechanism will become effective, and the latch will be arrested in the seventh position, which will select the balance column for the second and third cycles of this operation.

There is another means for controlling the automatic latch-controlling spider 591. This is from the total lever disk on ordinary totalizing operations. The total lever disk carries a roller 597 (Figs. 4 and 19), which cooperates with a plate 598, secured to an upwardly extending arm 599 of the spider 591. The arm 599 has a nose 600 adapted to move into the path of a shoulder 601, cut in the wing plate 578. When the total lever disk is in its normal adding position, the plate 598 is held with its notch embracing the roller 597, by a spring 602, stretched between the shaft 229 and the pin 603 of the spider 591. The nose 600, of the arm 599, is thus held out of the path of the shoulder 601 in the wing plate 578, and will have no effect thereon. When the total lever is moved to either its first position above or below its adding position, the roller 597 will come into contact with one of the inclined walls of the notch in the plate 598 and rock the spider 591 clockwise about the shaft 546. This movement is sufficient to cause the nose 595 to come into the path of the shoulder 596 on the wing plate 579, and thereby disconnect the differential latch in its "balance" position, in order to select the balance column upon clockwise movement of the plate 578. If the total lever plate is moved to its second or third position above or below its adding position the roller 597 is moved out of cooperative relation with the plate 598, and therefore the spring 602 rocks the spider 591 counter-clockwise until a pin 607 carried by a projection 608 of the spider 591 is resting on a projection 609 of a support plate, not shown. This positions the nose 600 in the path of the shoulder 601 on the wing plate 578. Therefore, when the differential mechanism moves clockwise, the shoulder 601 on the plate 578 will come into contact with the nose 600, and stop this plate and the differentially movable arm 577 in the "balance" position, which as above described, selects the balance column on the record strip and card. It can be seen, therefore, from the above, that in normal totalizing operations, no matter in which position the total lever may be, out of its adding position, the differential mechanism for the first control bank will be arrested in the seventh or balance position, in order to select the balance column, as all totals should be printed in this column.

It will be remembered that the subtract-balance and the overdraft-minus keys, which are in the first and second positions in the first control bank, do not cooperate with the detent 150, which rocks out the zero stop pawl 75. It will be recalled that another function of the detent is to rock the hook arm 156 from the path of the finger 157, (Fig. 14) in order to permit the release of the machine. It is evident, therefore, that mechanism must be provided whereby these two keys will rock the hook arm 156, out of its operative position, without affecting the position of the zero stop pawl. This function is accomplished in the following manner:

There is a special detent 610 (Fig. 14), provided in the first control bank. This detent has two inclined walls 611 in position to cooperate with the pins on the two lowermost keys in this bank, which are the subtract-balance key and the overdraft-minus key. The detent 610 has an upwardly extending arm 612 which has a cam surface 613 formed on its upper end, cooperating with a pin 614, carried by an arm 615, fast on the shaft 178. It will be remembered that also fast on this shaft 178 is the arm 179, carrying a pin cooperating with the lower end of the arm 181, which in turn has a pin 182 bearing against the hook arm 156. It can be seen from Fig. 14 that when either the subtract-balance or the overdraft-minus keys are depressed, the detent 610 will be rocked downwardly, thereby causing the cam surface 613 to rock the arm 615 clockwise. This will rock the shaft 178 and arm 179 clockwise, and the pin and the arm 181 and hook arm 156 counter-clockwise, thereby removing the hook arm 156 from the path of the finger 157, and permitting the release shaft 43 to rotate.

*Control of zero stop pawl in first control bank by keys in third control bank*

Figure 10:
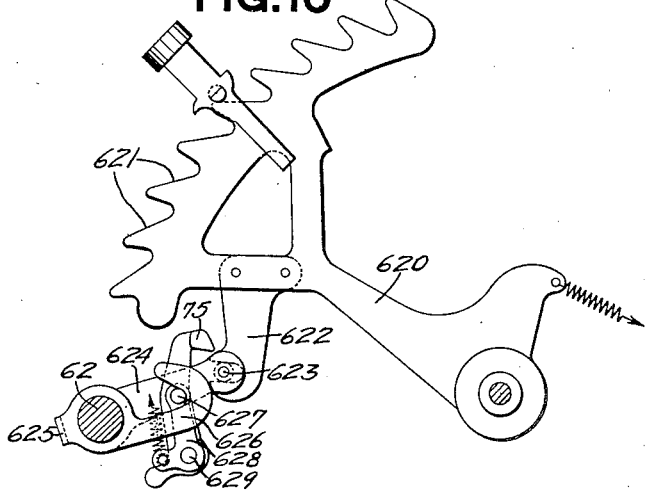
Fig. 10 is a detail view of the mechanism for rocking out the zero stop pawl in the first control bank by the depression of a key in the third row bank.

On ordinary single cycle operations, when a key in the third control bank is depressed, it is desired to have the differential latch of the first control bank disconnect from its driver in the ninth position, in order that the debit column on the record strip and the card will be selected, as the keys in the first control bank are debit keys. In order to accomplish this function, the zero stop pawl for the first control bank must be rocked to its ineffective position, and this is done in the following manner:

Cooperating with the keys of the third control bank is a detent 620 (Fig. 10), which has a plurality of inclined surfaces 621, one for each of the keys in the third control bank. The detent 620 has a downwardly extending finger 622, which is bifurcated, and cooperates with a pin 623, carried by an arm 624, loosely mounted on the rod 62. The arm 624 is connected by a yoke 625, to a hook arm 626, which cooperates with a pin 627, carried by an arm 628, fast on a shaft 629, supported by the key frame in the first control bank.

Also fast on the shaft 629 is the zero stop pawl 75. It can be seen from Fig. 10 that when one of the keys in the third control bank is depressed, the detent 620 will be rocked counter-clockwise, thereby rocking the arm 624 and the hook arm 626 in a clockwise direction, and causing the hook arm 626 to cam the pin 627 and arm 628 in a counter-clockwise direction, which movement through the shaft 629 will rock the zero stop pawl 75 to its ineffective position. It is evident that with the zero stop pawl rocked to its ineffective position, the differential mechanism for the first control bank will move upward and strike the stud in the ninth position, thereby selecting the debit column.

The keys in the second control bank are credit keys, and it is desired that the amounts entered when these keys are depressed, be printed in the credit column of the record strip and the card. No mechanism is therefore provided for these keys, to rock out the zero stop pawl in the first control bank. The differential will, therefore stop in the zero position, in which position the credit column on the record strip and card will be selected.

*Printer*

The printing mechanism used with the present invention is very similar to that shown and described in the above mentioned Letters Patent of the United States, No. 1,761,542, issued to B. M. Shipley, on June 3, 1930. In view of this fact only a very brief description of the portions of the printing mechanism will be given herein, as reference can be made to this patent for a detailed description thereof.

There are two lines of type wheels 640 and 641 (Fig. 34) loosely mounted on rods 642 and 643 respectively, projecting from a frame 644, which together with the frame 645, shown in Fig. 27, are the main means of support for the printing mechanism. Each of the amount differential mechanisms has three corresponding type wheels on each of the printer lines. This is necessary, as the amounts may be printed in any one of three columns, therefore, three sets of type are provided, which receives identical setting through well known mechanism not shown herein.

*Upper impression mechanism*

Figure 34:
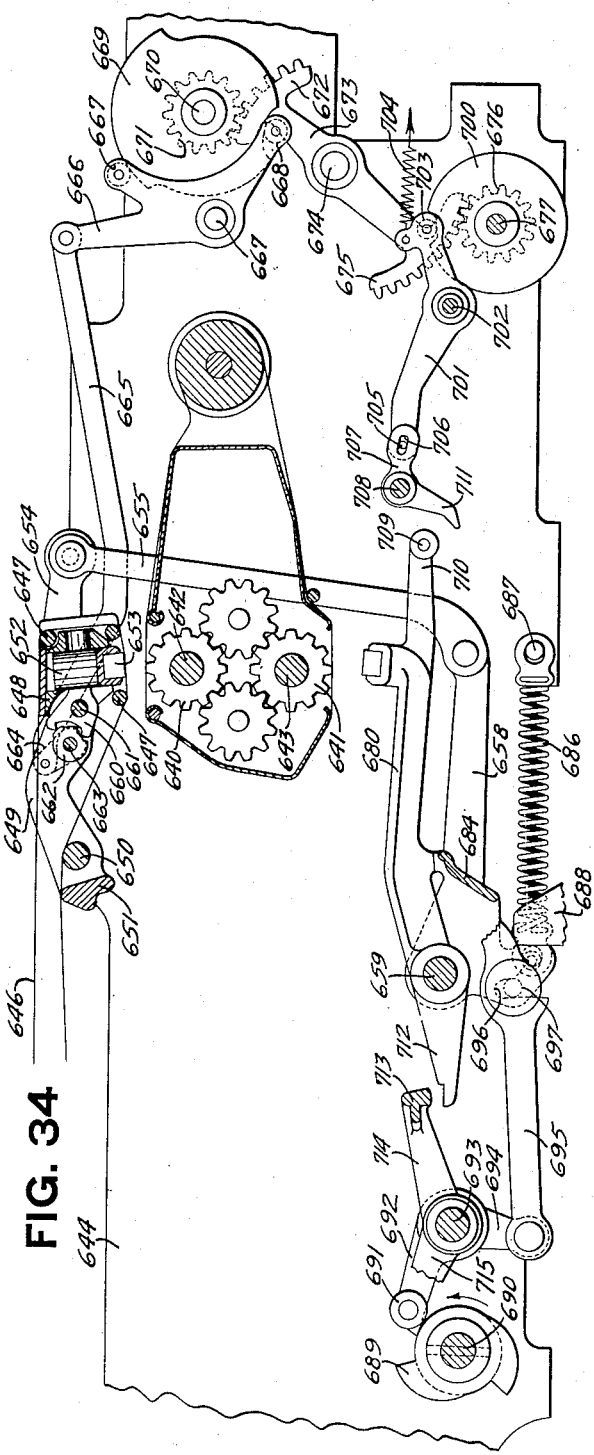
Fig. 34 is a front view of a portion of the printing mechanism used with the present invention.

The upper type line is for the purpose of printing on the record strip 646 (Figs. 34 and 38). The strip 646 passes about three rollers 647, carried by a platen support 648, which in turn is supported by a pair of arms 649, pivoted on a rod 650, and connected at their rear ends by a yoke 651. The platen support 648 carries three vertically movable cylinders 652, which support rubber platens 653, adapted to cooperate with upper type wheels 640. In order to take an impression from the upper type wheels, the platen support 648 has an arm 654 fast thereto, to which is pivoted the upper end of a link 655, pivoted at its lower end to a lever 658, loosely mounted on a shaft 659, supported by the back frame. This lever is driven by a pair of cams 657 (Fig. 35) first in a clockwise and then in a counter-clockwise direction, and through the link 655 and arms 654 will rock the support 648 first clockwise and then counter-clockwise about the shaft 650, in order to make an impression on the record strip 646.

*Column selection for record strip*

It will be noticed (Fig. 38), that there are three columns in which amounts are printed on the record strip, these three columns being the debit, credit and balance columns. There is one of the platens 653 (Fig. 34), appropriate to each of these columns. All three of these platens are normally held up in such a position that they will not take an impression from the group of type wheels corresponding thereto. Mechanism is provided for selecting which of the platens 653 will be rendered effective on any particular operation, when the platen support 648 is rocked, and this mechanism will now be described.

Projecting into an opening in each of the cylinders 652, is one end of a lever 660 loose on the rod 661, supported in the platen support 648. The opposite ends of the levers 660 are bifurcated, and cooperate with small cams 662, fast on a shaft 663, supported by the arms 649. The shaft 663 also carries an arm 664, to which is pivoted one end of a link 665, which at its right hand end is pivoted to a three-armed lever 666, loose on a stud 667 supported by the frame 644. The lever 666 carries a pair of rollers 667 and 668, which cooperate with a cam 669, loose on a stud 670, projecting from the frame 644. Secured to the cam 669 is a pinion 671, which meshes with a segment gear 672, carried on the upper end of a lever 673 pivoted on a stud 674, and which at its lower end carries a segment gear 675, meshing with a pinion 676, fast on a shaft 677, supported by the printer frames 644 and 645. The shaft 677 is driven differentially by the differential mechanism appropriate to the first control bank. The connections whereby this is accomplished are old and very well known in machines of this type and include the differential arm 210 (Fig. 4), beam 215, link 217, arm 219, segment 220, pinion 222, which rotate the shaft 677 according to the differential movement of the arm 210, described above.

The differential movement of the shaft 677 will through the pinion 676, segment gear 675, lever 673, segment gear 672 and pinion 671, move the cam 669 in accordance with the differential position of the differential mechanism in the first control bank. The cams 669 are so designed that the lever 666 is rocked clockwise to different extents, depending upon the position in which the differential latch is arrested in the first control bank, and this movement of the lever 666 through the link 665 and arm 664 will rotate the shaft 663 to different extents.

The cams 662 on the shaft 663 are so positioned that the movement of the shaft 663 will rock the levers 660 clockwise successively. This will move the platens 653 down into operating position, in accordance with the setting of the differential mechanism in the first control bank, and will, therefore, select which one of the platens 653 is to be effective, and thereby select the column in which the amount will appear.

*Lower impression mechanism*

In order to take an impression from the lower type line, which has the type wheels 641 thereon, there are provided four separate and distinct hammers. These hammers are pivotally mounted on a shaft 659 (Figs. 34 and 35). The hammer 680 is for printing the date. The hammer 681, next behind the date hammer is for printing the debits. The hammer 682 is for printing the credits, and the hammer 683 is for printing the balance. All of the hammers are held in their normal positions by a yoke 684, supported by two arms 685 loosely mounted on the shaft 659.

The yoke 684 is normally held in contact with the hammers by a spring 686, stretched between a pin on the yoke, and a pin 687, projecting from the frame 644. The counter-clockwise movement of the yoke member is limited by means of a lug 688, which extends upwardly from the base of the machine.

When it is desired to taken an impression from the lower type wheels 641, the yoke 684 is rocked clockwise by a cam 689, fast on a shaft 690, supported by the printer frame. This cam cooperates with a roller 691, supported by a lever 692, loose on a shaft 693. The lever 692 has a downwardly extending arm 694, to which is pivoted one end of a link 695, which at its opposite end has a notch 696 formed therein. The notch 696 cooperates with a pin 697, projecting from a downwardly extending arm of the yoke 684. The cam 689 receives a complete counter-clockwise rotation during each cycle of operation, except the first cycle of a totalizing operation, which, of course, is the second cycle of a three-cycle operation, and during its rotation the cam rocks the lever 692 clockwise, which movement through the link 695, rocks the yoke 684 clockwise, and thereby lowers the hammers which are to print. When the point of the lever 692 drops off of the high point of the cam 689, the spring 686 which has been stretched by the clockwise movement of the yoke 684 rocks the yoke and the selected hammers with great rapidity, so that they will strike the lower type line and take an impression on the record card.

The cam 689 is provided with two high points so that the hammers will be lowered twice in an operation in order to print on two cards.

*Mechanism for selecting columns for the lower impression mechanism*

It has already been described how the shaft 677 receives differential adjustment, in accordance with the differential position given the mechanism of the first control bank. Fast on the shaft 677 are a plurality of cams 700, there being one of these cams for each of the hammers in the lower impression mechanism. The cams 700 are adapted to cooperate with rollers 703, carried by levers 701, loosely mounted on a rod 702. The levers 701 are normally rocked in a clockwise direction by springs 704, which are stretched between projections of the lever 701 and any suitable point on the mechanism. The levers 701 carry pins 705, which project through slots 706 in bell crank levers 707, loose on a rod 708. The bell crank levers 707 are adapted to cooperate with rollers 709, carried by projections 710 on each of the platen arms. It can be seen from Fig. 34 that in the normal position of the parts, the bell crank levers are in such a position that the downwardly extending arms 711 thereof, are not in the path of the rollers 709 on the hammer. The cams 700 have notches formed in their peripheries, arranged at different points thereabouts. The differential positioning of the shaft 700 by the differential mechanism of the first control bank, will position the cams 700 so that the cam appropriate to whichever one of the hammers it is desired to operate, will be moved to a position in which the roller 703 will rest in a notch of the periphery of the cam.

When the roller 703 is cammed out of the notch and onto the periphery of the disk, by rotation of the disk, the lever 701 will be rocked counter-clockwise, and through the slot and pin connection, the bell crank lever 707 will be rocked clockwise. This moves the arm 711 thereof beneath the roller 709 on its appropriate hammer to arrest the hammer when the yoke 684 is rocked clockwise, to prevent cocking of the hammer, and therefore no impression will be made on the record cards in the columns corresponding thereto.

From the above description it can be seen that all of the hammers are disabled except the hammer appropriate to the column in which it is desired to print. As the hammers are castings and are rather heavy for the cams 700 to raise when the bell crank levers 707 are rocked, means is provided for rocking all of the hammers in a counterclockwise direction, just before the bell crank levers 707 are adjusted. As the hammers move slightly upward, the bell crank levers are rocked beneath the rollers 709, except that the lever appropriate to the column in which it is desired to print is not rocked.

The mechanism for rocking all of the hammers counter-clockwise will now be described.

Each of the hammers has a rearwardly extending finger 712 adapted to cooperate with a yoke 713, carried by a pair of arms 714, loose on the shaft 694. The rear one of the arms 714 has a projection 715, (Fig. 35), which carriers a roller projecting into a cam slot formed in the disk 716, fast on the shaft 690, which is the main drive shaft of the printer.

The cam disk 716 (Fig. 35) is so designed that at the proper time the yoke 713 (Fig. 34) will be rocked in a clockwise direction. This movement of the yoke will cause the hammers to be rocked in a counter-clockwise direction. They are held in this position for a sufficient length of time for the bell crank levers 707 to be adjusted, whereupon the yoke 713 moves in a counter-clockwise direction, in order to permit the clockwise movement of the hammers, for the purpose of taking an impression. Near the end of the operation, the yoke 713 returns to the position shown in Fig. 34.

As the proper selection of the columns is the only portion of the printer which it is thought necessary to describe in connection with this application, it is believed that the foregoing description will be sufficient for a clear understanding of the column selecting mechanism, and any other description or illustration of the printer would be superfluous in this application.

Account cards

There are two cards printed by this machine. A facsimile of one of these cards is shown in Fig. 37. The other card is a duplicate of the one shown, with the exception that it is slightly longer, to provide means for removing it while an impression is being made on the smaller one, which lies beneath it. The ruling of the columns and the printed designations are the same in both cases.

At the top of each card is a space for the name of the firm and that of the customer, together with the account number. Below this space there are twenty-four numbered lines. The card is divided into columns by vertical lines. This form of card is not, of course, the only one which could be used with this invention, but it is the desired form for the use with the embodiment thereof, shown herein.

Card carriag

The cards are placed on a table or carriage, which is slidably mounted for movement crosswise of the machine, to position the cards properly to receive an impression from the lower type wheels. This carriage consists of a table 725 (Figs. 26 and 27), supported by suitable bearings, slidable on a shaft 726, which is supported by brackets 727 and 728, projecting forwardly from the front printer frame 645. The rear end of the carriage is supported by a roller which runs on a suitable track (not shown).

Guide for account cards

The shorter of the two cards is first placed on the carriage between two parallel guides 730, which are secured to the sides of the table 725. The other card which is larger than the card already inserted, is then placed in the machine between two guide plates 731, having folded edges, and which are mounted above the guides 730. Two flat springs 732 are provided to hold the lowermost card in place.

Line selector

It is, of course, desirable to print the entries in the first available blank line. In order to facilitate the selection of any desired blank line, a line selecting mechanism is provided which enables the operator to simply depress a key appropriate to the next blank line, whereupon the carriage may be moved to the right until it is stopped in the correct position. This mechanism is identical with that shown and described in Letters Patent of the United States, No. 1,747,397, issued to B. M. Shipley on February 18, 1930, and reference may be made thereto for a complete description thereof. It is thought to be sufficient herein to state that the line selecting keys 735 are shown generally in Fig. 26. It may also be stated that the depressed keys will be released only when a balance operation is recorded. When the key is released, the carriage will be turned automatically to its extreme left hand position by a powerful spring (not shown herein).

Card tension mechanism

Mechanism is provided to hold the upper card against movement during the time it is being printed upon. In order to accomplish this there are two pairs of knurled rollers which are normally separated, but which can be brought together to hold the cards against movement.

The card tension mechanism includes two pairs of rollers (Figs. 27, 30 and 31). The upper roller 740 of each pair, is supported by an arm 741 loosely mounted on a shaft 742, carried by the frame of the carriage. Pinned to this shaft is an arm 743, carrying a pin 744. A torsion spring 745 is wrapped around the shaft 742 and anchored at one end to the pin 744. At its other end the spring is attached to a pin 746, carried by an arm 741. Also fast on shaft 742 are two arms 747, one on each side of the carriage, and connected by a rod 748. Loose on a stud 749 is a lever 750, which at its opposite end carries two pins 751, placed one above and one beneath the rod 748. It will be seen that this construction permits the lever 750 to act on the rod 748, no matter in what lateral position the carriage may be.

At the begining of the operation of the machine, the lever 750 is rocked counter-clockwise (Fig. 27) by mechanism which will be presently described. This movement rocks rod 748, arm 747, shaft 742 and arm 743 clockwise (Fig. 30). The movement of arm 743 will through spring 745 rock arm 741 and bring the roller 740 down into cooperative relation with the lower roller 752 of its pair. The arm 743 will move slightly farther than arm 741 and the spring will thereby be tensioned to hold the inserted slip against movement during the printing operation. The means for operating the lever 750 will now be described.

The lever 750 has a cam slot 754 formed therein, with which a pin 755 carried by an arm 756 cooperates. Also pivoted to arm 756 is the right hand end of a link 757 (Fig. 27) which is supported by an arm 759, carried by the frame. Pivoted to the left hand end of link 757 is another link 765, supported by arm 759 and a similar arm 758. Pivoted to the left hand end of link 765 is a lever 772, which has a notch 760 formed therein to cooperate with a pin 761, carried by a lever 762, pivoted to the machine frame. The lever 762 carries two rollers which cooperate with a pair of cams 763 and 764, fast on the shaft 690, which is the main drive shaft of the printing mechanism. This shaft, and therefore the cams 763 and 764, receives one complete counter-clockwise rotation during both adding and totalizing operations. These cams are so designed that the lever 762 is rocked first clockwise and then counter-clockwise. During the clockwise movement of the lever, the links 765 and 757 are moved toward the left, as viewed in Figs. 27 and 28, through the lever 772. This movement of link 757 will through the cooperation of pin 755 and slot 754 move the lever 750 down and operate the card tension rollers, as above described.

Means is provided for manually disconnecting the link 765 from its driving mechanism. A sleeve 766 (Figs. 27, 28 and 36) is carried by a stud 767 supported by the printer frame. Secured to the forward end of this sleeve is a knurled knob located in such a position as to be easily grasped by the hand of the operator. Also fast on this sleeve is an arm 768 adapted to cooperate with an extension 769 of the lever 772. It can be seen from Fig. 28 that when the knob is turned a quarter turn in a counter-clockwise direction the lever 772 will be rocked against the tension of a spring a sufficient distance to disconnect the notch 760 from the pin 761.

The lever 769 will be rocked counter-clockwise until a notch 770 therein engages a pin 771, projecting from the frame, thereby holding the lever 772 and links 757 and 765 against movement. The lever 762 will be rocked idly during the operation. It can be seen that as the link 757 is not moved the card tension mechanism will not be operated.

Card feeding mechanism

It is necessary to print on both cards, and in order to do this the upper card must be removed from the printing position after it has been printed upon, to permit an impression to be made on the lower card. In a three-cycle operation, however, the upper card must be returned to printing position, during the last cycle of operation, in order to receive the proper impression thereon.

This function is readily accomplished by rotating the large card tension rollers 752. It can be seen from Fig. 30 that if this roller of each pair is rotated clockwise after the tension has been established between it and the roller 740, the upper card will be moved to its printing position. Near the end of the first cycle, the movement of rollers 752 is reversed and therefore the card will be fed toward the front of the machine. This same feeding movement also occurs on the third cycle of every three-cycle operation.

In order to accomplish the above described function, the rollers 752 are operatively connected to the shaft 726 (Figs. 27, 30 and 31). The carriage and the rollers 752 are, therefore, slidable laterally of the machine to any desired position. In order to withdraw the cards from printing position, the shaft is rotated counter-clockwise, as viewed in Fig. 30. The means for driving this shaft to withdraw and reinsert the cards will now be described.

Fast on the main printer drive shaft 690 are two cams 780 and 781 cooperating with two rollers 782 and 783, carried by a fan-shaped arm 784, loosely mounted on a stud 785, projecting from the front printer frame 645 (Figs. 29, 32 and 33). The arm 784 is connected by a hub 786 to a segment gear 787, which in turn meshes with a segment gear 788, loosely mounted on the shaft 693, above mentioned. The segment gear 788 is connected by a hub 789 to a segment gear 790, loosely mounted on the shaft 693. Segment gear 790 meshes with a segment gear 773 pinned to a larger segment gear 791, which meshes with a pinion 792, loose on the shaft 693, but connected by a sleeve 793 to a gear 794. The gear 794 meshes with a gear 795 loose on shaft 690. The gear 795 is secured to a spiral gear 796 (Figs. 26, 27 and 33) which meshes with a spiral pinion 797, fast on a short shaft which has a bearing in the bracket 727. Also fast on the shaft just above mentioned, is a gear 798, which meshes with a similar gear 799, fast on the left hand end of the shaft 726, previously described. It can be seen that through the above described connections the shaft 726 will be rotated first clockwise to feed the card into printing position, and then counter-clockwise to withdraw the card from the printing position during every operation of the machine, both for adding and totalizing.

*Friction drive for card feeding rollers*

The rollers 752 are driven frictionally from the shaft 726. The construction of the drive means for one of the rollers is shown in detail in Fig. 31 and includes collars 801 and 806, pinned together, and connected to the shaft 726 by a key 800. The collars have flanges 805 and 802 respectively, which flanges form guides for the roller 752 which turns on the collar 801. A spring friction-washer 803 is also mounted on the collar 801 adjacent the roller 752. When the shaft 726 is rotated the collars 801 and 806 will also be rotated and the spring friction-washer 803 will force the roller 752 over against the flange 802, and the roller 752 will be driven by the friction created between the flanges 802 and 805 and the roller 752 and washer 803. When the card is fed backward into the machine at the end of the first cycle of operation, the card will strike a stop 804 (Fig. 26). The collars 801 and 806 are driven slightly farther than is necessary to move the card to its innermost position against the stop 804, and therefore, when the card reaches this position the roller 752 will stop its rotation and due to the frictional connection between the roller 752 and the flanges 805 and 802 of the collars 801 and 806 may be driven slightly farther. The purpose of this construction is to insure the positioning of the card against the stop 804, and to guard against the possibility of any rebound of the card which might occur when the card comes in contact with the stop.

*Operation*

A short résumé of the operation of this register will be given in connection with the account card and record strip illustrated in Figs. 37 and 38. Fig. 37 shows a facsimile of the card of John Smith, in account with the wholesale grocery of John Doe. It will be noticed that the first entry on the record card is the balance carried forward of $1256.37.

The second entry is made, by first setting up the $1256.37 on the amount keyboard, and depressing the old balance key and the motor key which will cause the old balance to be added into the add and sub totalizer. It will be noticed that John Smith paid on account $200.00, which entry is made by setting up the $200.00 on the amount keys, depressing the paid-on-account key in the second bank, and the subtract-balance key in the first control bank. The subtract-balance key is a three-cycle key and therefore, the machine will operate throughout three cycles without stopping.

On the first cycle of operation the credit of $200.00 will be printed in the credit column of the account card and will be subtracted from the old balance of $1256.37, leaving a balance of $1056.37 on the adding and subtracting counter, which will then be cleared during the second and third cycles of operation, and the amount as shown printed in the balance column during the third cycle of operation.

This amount as well as all others are printed on both cards. In three-cycle operations it will be remembered however that the upper card is inserted and then removed on both the first and third cycles to permit an impression on the lower card.

On January 8, it will be noticed that John Smith bought three cases of soap for $18.00, two barrels of apples for $9.60 and twelve barrels of flour for $37.24, together with 200 pounds of coffee and 200 pounds of spices for $352.80.

The first item of $18.00 for three cases of soap is entered by depressing the amount keys for $18.00, and the key having the caption "Soap dept." in the third control bank, together with the motor key. This will add $18.00 to the old balance, which it should be understood has been previously picked up on the adding and subtracting totalizer, but which does not appear twice on the card, as the card is not inserted during the old balance pick up operation. The $9.60 for apples is then entered by depressing the proper amount keys, and the miscellaneous key in the third control bank. The twelve barrels of flour for $37.24 can next be added in by depressing the Cereal department key and the motor key, and finally the $352.80 for coffee and spices is entered by depressing the amount keys, the Coffee and Spice department key and the add-balance key, and then depressing the motor key. As the add-balance key was pressed on this operation, the machine will go through three cycles. On the first cycle the $352.80 is added to the previous balance on the adding and subtracting totalizer, and on the second and third cycles the totalizer is cleared, the new balance of $1474.01 being printed in the balance column.

On January 16, John Smith returned 100 cartons of cereal for a credit of $330.00. The old balance of $1474.01 is entered on the amount keys, and the machine is operated by depressing the old balance plus key and the motor key. The $330.00 is then set up on the amount keys, and the Goods Returned key in the second control bank, together with the subtract-balance key in the first control bank is depressed, and the motor key operated. This will be a three-cycle operation also. On the first cycle of operation the $330.00 will be subtracted from the old balance of $1474.01, and on the second and third cycles the new balance of $1144.01 will be printed in the balance column.

On January 18 John Smith bought $40.00 worth of dried beans. After the old balance is picked up, $40.00 is set up on the amount keys, and the appropriate transaction key and the add balance key are depressed. The machine is released by depressing the motor key whereupon the amount is added on the add and sub totalizer and the total automatically taken. The new balance of $1184.01 being printed in the balance column.

On January 18, John Smith paid on account $1000.00. This is entered in the same way as the $200.00 payment on account above noted, leaving a balance owing to John Doe of $184.01.

Also, on January 18, John Smith returned breakfast food to the value of $200.00, with which his account is credited in the manner above described, in connection with the item of $330.00. In this case, however, his debit balance was only $184.01, and therefore the adding and subtracting totalizer passes over zero. At the end of this operation the register prints the complement of the credit balance, which is due the customer. It is well known that when an adding and subtracting totalizer passes over zero in either direction, one cent must be added to the result, in order to get the correct balance, and therefore the next operation will be to add one cent by pressing the overdraft-minus key, which is a three-cycle key. On the first cycle the one cent will be added to the adding and subtracting totalizer, and on the second and third operations, the minus side of the totalizer will be cleared, thereby printing the credit balance of $15.99.

On January 18, Mr. Smith bought $28.00 worth of creamery butter, and as he has a credit balance of $15.99, his debit balance at the end of this transaction will be $12.01. It is felt that the above description of the various operations shown on the record card, will give a thorough understanding of the operation of the machine, embodying the present invention.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

What is claimed is:—

1. In a machine of the class described, the combination of an adding and total taking mechanism, driving means to operate said mechanism through one cycle, two cycle, or three cycle operations, and manipulative means controlling said driving means to determine the number of cycles to be given said mechanism.

2. In a cash register, the combination of a totalizer, clearing means therefor, means for entering a plurality of items in said totalizer, means for printing each item, means to actuate the clearing means, the item entering means, and printing means, and means for automatically controlling the actuating means whereby the latter is driven to actuate the clearing and printing means to print the total of said items and clear said totalizer in an operation which is a continuation and a part of said last item entering operation.

3. In a cash register, the combination of a totalizer, printing mechanism, means for printing a series of items in one column, means whereby upon the entry of the last of said items the operation of the machine will continue in order to clear said totalizer and print the total thereon, and means for automatically selecting a different column from that selected for said items.

4. In a cash register, the combination of recording mechanism, means for controlling said recording mechanism to record in appropriate columns on record material both an item and a total during a single continuous operation of said register, and means for automatically selecting a column in which to record said item and another column in which to record said total during the single continuous operation.

5. In a machine of the class described, the combination of a printing mechanism adapted to be operated through a plurality of cycles and make two impressions on each cycle, means adapted to receive two record receiving elements in printing position, one over the other, and means to withdraw one of said elements from printing position and to feed it back into printing position during each cycle of operation.

6. In a machine of the class described, the combination of a printing mechanism adapted to be operated through a plurality of cycles and make two impressions on each cycle, means adapted to receive two record receiving elements in printing position one over the other, and means to withdraw the upper one of said elements from printing position and to feed it back into printing position during each cycle so as to permit impressions to be made on the lower element during each cycle of operation.

7. In a machine of the class described, the combination of a printing mechanism having a plurality of cycles of operation and adapted to make two impressions on each cycle, a support adapted to receive two superimposed record cards, means for removing the upper card to permit an impression to be made on the lower card, and means for returning said upper card to printing position before the first impression of the next cycle of operation.

8. In a machine of the class described, the combination of a printing mechanism having a plurality of cycles of operation and adapted to make two impressions of the type on each cycle, a carriage adapted to receive two superimposed record cards, two pairs of normally separated rollers between which said upper card is placed on said carriage, means for moving the upper rollers into cooperative relation with said lower rollers to hold said upper card against movement while an impression is made thereon, means for rotating the lower rollers of each pair to feed the upper card out of printing position while an impression is made on the lower card and then returning said upper card to printing position before the first impresion of the next cycle of operation, means for stopping said card before said return feeding movement is completed, and a slip connection between said rollers and their rotating means to permit the card to be stopped.

9. In a cash register, the combination of a totalizer, actuators, means for engaging said totalizer with said actuators to enter an item, manually operated means for controlling said engaging mechanism when a total is to be printed, and means effective on certain totalizing operations for controlling said engaging mechanism automatically.

10. In a cash register, the combination of a totalizer, actuators, means for engaging said totalizer with said actuators to enter an item, a lever for normally changing the time when said engaging mechanism will be effective, and means for automatically effecting such change in time on certain of said totalizing operations.

11. In a cash register, the combination of a totalizer, actuators therefor, means for engaging said totalizer with said actuators, a shaft for controlling the time of said engagement of said totalizer, a manually adjustable lever for controlling the position of said shaft, and means for controlling said shaft automatically on certain totalizing operations when said lever remains in its normal position.

12. In a cash register, the combination of a totalizer, actuators therefor, means for engaging said totalizer with said actuators, a shaft for controlling the time of said engagement of said totalizer, a manually adjustable lever for controlling the position of said shaft, a mechanism for controlling the position of said shaft, and a plurality of depressible keys to render the mechanism active for controlling said shaft automatically on certain totalizing operations when said lever remains in its normal position.

13. In a cash register, the combination of an accounting device, an actuator therefor, mechanism for driving the actuator, mechanism for engaging the accounting device with the actuator, and a plurality of keys for controlling said engaging mechanism and the operation of the driving mechanism to cause the latter to complete either a one or a three cycle operation of the machine.

14. In a cash register, the combination of an accounting device, an actuator therefor, means for operating the actuator, mechanism for engaging the accounting device with the actuator, and a plurality of depressible keys having connections for causing three consecutive operations of said actuator and for rendering said engaging mechanism operative but twice during the three consecutive operations.

15. In a cash register, the combination with an accounting device, an actuator therefor, means for operating the actuator, mechanism for normally engaging and disengaging the accounting device with the actuator during one operation of the actuator, and a plurality of keys capable of rendering said mechanism automatically operative to engage and disengage the totalizer but once during two operations of the actuator.

16. In a cash register adapted to receive three cycles of operation, an accounting device, an actuator therefor, mechanism for engaging and disengaging said accounting device from said totalizer during said first cycle, and automatic means to control said mechanism for engaging said device with said actuator during said second cycle, and disengaging said device from said actuator during said third cycle.

17. In a cash register having three cycles of operation, the combination of an accounting device, an actuator therefor, means for operating said actuator, means for normally engaging and disengaging the accounting device with the actuator during the first cycle of operation, and a plurality of depressible keys capable of rendering said mechanism operable to engage and disengage the totalizer but once during the last two cycles of operation.

18. In a cash register, the combination of a plurality of accounting devices, an actuator therefor, means whereby said plurality of accounting devices are adapted to be simultaneously operated by the actuator to have items entered therein, and a plurality of depressible keys for selecting one of the accounting devices for a total taking operation, said keys disturbing the regular controlling mechanism of the machine and adapted to effect three consecutive and continuous operations of the machine.

19. In a machine of the class described capable of adding operations, total taking operations and combined adding and total taking operations; the combination of totalizer actuators, totalizers, means for engaging the totalizers with the actuators during adding and total taking operations and combined adding and total taking operations, means for controlling the engaging means to engage totalizers selectively in adding and in combined adding and total taking operations, other means for controlling the engaging means to engage the totalizers selectively in total taking operations, and manipulative means for controlling the various operations of said engaging means.

20. In a machine capable of automatically performing a continuous operation of combined adding and total taking operations, totalizers, actuators therefor, means for engaging the totalizers with the actuators, and a single mechanism for controlling the engaging means to engage two totalizers with the actuators during said adding operation and one only during total taking operations.

21. In a machine capable of automatically performing a continuous operation of combined adding and total taking operations, totalizers, actuators therefor, means for engaging the totalizers with the actuators, a plurality of transaction keys, a bank of control keys for controlling the machine to perform said continuous operation, means under control of said transaction and control keys for controlling said engaging means to engage two totalizers in the adding part of the operation and one of said two totalizers in the total taking part of said operation.

22. In a machine capable of automatically performing a continuous operation of combined adding and total taking operations, totalizers, actuators therefor, means for engaging the totalizers with the actuators, a plurality of transaction keys, a bank of control keys for controlling the machine to perform said continuous operation, a plate differentially adjustable under control of said transaction keys for controlling the engaging of certain of said totalizers during the adding part of said operation, and a second plate differentially adjustable under said bank of control keys for controlling the engaging of a different totalizer during both the adding and total taking part of said operation.

23. In a machine of the class described capable of performing adding, total taking, and combined adding and total taking operations, the combination of a computing totalizer, actuators therefor, means for engaging the totalizer with the actuators, a total lever movable into a position to control the engaging means to engage said totalizer with the actuators during total taking operations, and means operable with the total lever in its home position for controlling the engaging means during the total taking part of a combined adding and total taking operation.

24. In a machine capable of automatically taking the total after the entry of the last of a series of items, transaction totalizers, computing totalizers, a column printing mechanism, means for controlling the entry of the last of the series of items in a transaction totalizer and in the computing totalizer and the printing of said item in an appropriate column, and means for causing the total on said computing totalizer to be taken and printed in its appropriate but different column.

25. In a machine adapted to perform plural-cycle operations, the combination with a differential mechanism; and manipulative devices to arrest the mechanism differentially during one cycle; of means superseding the manipulative devices to arrest the differential in a certain position during the other cycles of an operation.

26. In a machine adapted to perform plural-cycle operations, the combination with a differential mechanism; and manipulative devices to arrest the mechanism differentially during one cycle; of means to arrest the differential in a certain position during the remaining cycles of an operation; and automatic means to shift the last-named means into effective position.

27. In a machine adapted to perform plural-cycle operations, the combination with a differential mechanism; and manipulative devices to arrest the mechanism differentially during one cycle; of means to arrest the differential mechanism in a certain position during all other cycles of an operation; a shaft; and connections operated by the shaft to move the last-named means into effective position.

28. In a machine adapted to perform plural-cycle operations, the combination with a differential mechanism; and manipulative devices to arrest the mechanism differentially during one cycle; of means to arrest the differential mechanism in a certain position during the two other cycles of an operation; a shaft; a cam on the shaft; a pitman actuated by the cam; and connections operated by the pitman to move the last-named means into effective position.

29. In a machine adapted to perform plural-cycle operations, the combination with a differential mechanism; and manipulative devices to arrest the mechanism differentially during one cycle of an operation; of means to arrest the differential in a certain position during a plurality of other cycles of an operation; a shaft; a cam on the shaft; a pitman actuated by the cam; connections operated by the pitman to move the last-named means into effective position; and a manipulative means to render the shaft active.

30. In a machine adapted to perform plural-cycle operations, the combination with a differential mechanism; and manipulative devices to arrest the mechanism differentially during one cycle of an operation; of a bell crank connected to the differentially movable mechanism; a stop normally out of the path of an arm of the bell crank; automatic means to move the stop into the path of the arm to arrest the differential mechanism in a certain position during the remaining cycles of an operation.

31. In a machine adapted to perform one cycle or plural-cycle operations, the combination with a differential mechanism; and manipulative devices to arrest the mechanism differentially during one-cycle operations and during one cycle of the plural-cycle operations; of a bell crank connected to the differentially movable mechanism; a stop normally out of the path of the arm of the bell crank; a shaft normally inactive during one-cycle operations; manipulative means to render the shaft active during plural-cycle operations; and connections between the shaft and a stop to move the stop into the path of the arm on the bell crank to arrest the differential mechanism in a definite position during certain cycles of a plural-cycle operation.

32. In a machine adapted to perform plural-cycle operations, the combination with a differential mechanism; and manipulative devices to arrest the mechanism differentially during one cycle of an operation; of means to arrest the differential in a definite position during certain other cycles of an operation; automatic mechanism to position the arresting means to stop the differential; a main operating mechanism; and manipulative means to connect the automatic mechanism with the main operating mechanism.

33. In a machine adapted to perform one cycle or plural-cycle operations, the combination with a differential mechanism; and manipulative devices to arrest the mechanism differentially during one cycle of an operation; of means to arrest the differential in a certain position during the other cycles of an operation; automatic mechanism to position the arresting means to stop the differential; a main operating mechanism; a manipulative means to control the mechanism for plural-cycle operations; and connections between the manipulative means and the automatic mechanism to connect the automatic mechanism with the main operating mechanism.

34. In a machine adapted to perform plural-cycle operations, the combination with a differential mechanism; and manipulative devices to arrest the mechanism differentially during one cycle of an operation; of means to arrest the differential in a certain position during other cycles of an operation; a shaft; means on the shaft to move the arresting means into position to stop the differential; a main operating mechanism; means to drive the shaft; a coupling device to couple the drive means to the main operating mechanism; and manipulative means to move the coupling device into coupling position.

35. In a machine of the class described, the combination of a totalizer, means to enter items into the totalizer, resetting means to reset the totalizer to zero, and means to control the machine to perform an item-entry operation and a reset operation during one continuous operation of the machine.

36. In a machine of the class described, the combination of a totalizer, means to enter items into the totalizer, resetting means to reset the totalizer to zero, manually adjustable means to control the resetting means for a reset operation, and automatic means controlled as an incident to an item-entry operation to control the resetting means for a resetting operation, said item-entry and resetting operations being performed in one continuous operation.

37. In a machine of the class described, the combination of a totalizer, means to enter an item into the totalizer, a resetting means for the totalizer, automatic means normally disconnected from the driving means of the machine to render the resetting means effective, and the means to connect the automatic means to the driving means before the entry of an item to cause the automatic means to reset the totalizer to zero after the item is entered, without interruption of the machine.

38. In a machine of the class described, the combination of a totalizer, actuators, means for engaging said totalizer with said actuators to enter an item into the totalizer, a mechanism for changing the time when said engaging mechanism is effective for total taking operations, and a plurality of keys the depression of any one of which automatically renders the mechanism active to effect such change of time during certain total taking operations.

39. In a cash register, the combination of a totalizer, actuators, means for engaging said totalizer with said actuators to enter an item into the totalizer, means for automatically changing the time when said engaging mechanism is effective during total taking operations and automatic means to actuate the last-named means.

40. In a machine of the class described, the combination of a totalizer; means to enter a plurality of items in the totalizer; means for printing each item; means to automatically reset the totalizer and print the total of said items; and manipulative means, operable prior to the entry of the last item, to control the automatic resetting means.

41. In a machine of the class described, the combination of a totalizer, actuators, means to engage the totalizer with the actuators to enter items, a lever to normally change the time when the engaging means is effective, mechanism to automatically change the time when the engaging means is effective, and a plurality of keys the depression of any one of which controls the automatic mechanism to cause the automatic mechanism to change the time when the engaging means is effective.

42. In a cash register, the combination with a totalizer; item entering means; and means to record the item as the item is entered; of automatic means controlled during the item entering operation to control said recording means to record the total on the totalizer upon completion of the actuation of the item entering and recording means in one uninterrupted operation of the machine.

43. In a cash register, the combination with a totalizer; item entering means; means to record the items as the items are entered; a main operating mechanism therefor; of automatic means controlled during the last item entering operation to control the main operating mechanism to effect another operation of the recording means to record the total on the totalizer during one uninterrupted operation of the machine; and a manipulative device to determine the effectivity of said automatic means.

44. In a cash register, the combination with a totalizer; means to enter a plurality of items into the totalizer; resetting means therefor; mechanism to record each item; and a main operating device to actuate said means and mechanism; of means to automatically control the main operating device to actuate the resetting means and recording mechanism to reset the totalizer and record the total of all the items after the last item is entered and recorded; and manipulative means operable when the last item is entered and recorded to determine the effectivity of the automatic means.

In testimony whereof I affix my signature.

SAMUEL BRAND.